United States Patent [19]
Powers

[11] Patent Number: 5,956,691
[45] Date of Patent: Sep. 21, 1999

[54] DYNAMIC POLICY ILLUSTRATION SYSTEM

[75] Inventor: James G. Powers, Albany, Oreg.

[73] Assignee: Second Opinion Financial Systems, Inc., Phila., Pa.

[21] Appl. No.: 08/778,073

[22] Filed: Jan. 7, 1997

[51] Int. Cl.⁶ .................................................. G06F 17/60
[52] U.S. Cl. .............................................. 705/4; 345/400
[58] Field of Search ............................ 705/4, 2, 35, 36, 705/38; 345/341, 440

[56] References Cited

U.S. PATENT DOCUMENTS

| | | | |
|---|---|---|---|
| 4,800,510 | 1/1989 | Vinberg et al. | 345/440 |
| 4,831,526 | 5/1989 | Luchs et al. | 705/4 |
| 4,837,693 | 6/1989 | Schotz | 705/4 |
| 4,839,804 | 6/1989 | Roberts et al. | 705/36 |
| 4,899,292 | 2/1990 | Montagna et al. | 707/501 |
| 4,953,085 | 8/1990 | Atkins | 705/36 |
| 4,975,840 | 12/1990 | DeTore et al. | 705/4 |
| 5,083,270 | 1/1992 | Gross et al. | 705/35 |
| 5,237,500 | 8/1993 | Perg et al. | 705/35 |
| 5,479,344 | 12/1995 | Keziah, Jr. | 705/4 |
| 5,504,674 | 4/1996 | Chen et al. | 705/4 |
| 5,523,942 | 6/1996 | Tyler et al. | 705/4 |
| 5,550,746 | 8/1996 | Jacobs | 364/479.01 |
| 5,655,085 | 8/1997 | Ryan et al. | 705/4 |

OTHER PUBLICATIONS

Insmark WebSite: http://insmark.com copyright 1983–86, 88–90, 90, 92–93, 95.
United Systems WebSite: http//206.107.179.150/index.htm Last Update—Jul. 18, 1996.
FIPSCO WebSite: http//www.fipsco.com Microsoft Internet Explorer Copyright 1996.
Financial Profiles WebSite: http//www.profiles.com Version 5 Update News, since 1969.

*Primary Examiner*—Emanuel Todd Voeltz
*Assistant Examiner*—Raguel Alvarez
*Attorney, Agent, or Firm*—Caesar, Rivise, Bernstein, Cohen & Pokotilow, Ltd.

[57] ABSTRACT

A dynamic, user friendly insurance policy illustration system for computing and graphically displaying the future values of a model life insurance policy. Key variables are entered and a graphic display of future values is instantly displayed. Variable keys can be selected to recalculate or solve for a certain stated policy performance, or variables can be entered and changed at will to display various "what if" life insurance scenarios. Variables can be rapidly moved through a range of values to create a "move" of the illustrated values changing from variable "A" to "B."

The dynamic policy illustration system has built-in tables which can be used to view the effect various economic changes may have on a life insurance illustration.

In addition, the dynamic policy illustration system includes an interactive expectations assessment process that uses a questionnaire, inferences and feedback for educating the user about life insurance and thereby leads the user to the most suitable life insurance policy selection based on his/her responses.

55 Claims, 32 Drawing Sheets

FIG. 8

Risk/Opportunity Ratios
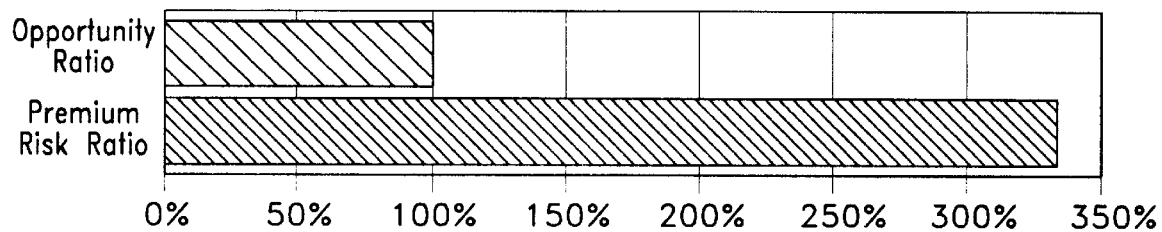
FIG. 16
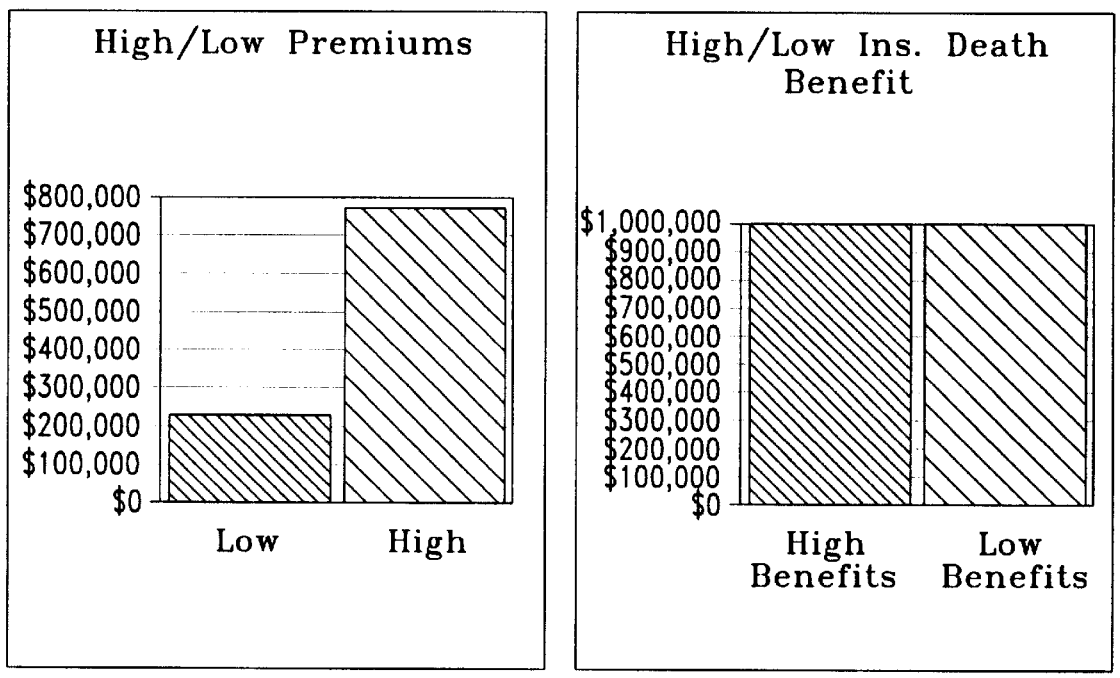
FIG. 17  FIG. 18
|  | Premiums | Opportunity |
|---|---|---|
| Upside | $231,090 | $1,000,000 |
| Downside | $766,806 | $1,000,000 |
|  | Premiums | Opportunity |
|---|---|---|
| Risk Ratio | 332% | 100% |
FIG. 19

PLEASE ENTER THE AGENT INFORMATION HERE

AGENT NAME | JAMES | G | POWERS
FIRST | MI | LAST

AGENT ID NUMBER | 7481

BUISINESS NAME | FOUR SEASONS FINANCIAL ADVISORS

ADDRESS | 26012 BRYANT DRIVE

| ALBANY | OR | 97321
CITY | STATE

PHONE | 503 | 926 - 3024
AREA CODE | NUMBER

FAX | 503 | 926 - 3024
AREA CODE | NUMBER

*FIG. 22*

| | FIRST INSURED | 2nd INSURED |
|---:|:---:|:---:|
| PLEASE ENTER THE CLIENT INFORMATION HERE | | |
| DEATH BENEFIT | $1,000,000 | $1,000,000 |
| POLICY TYPE | UL | |
| POLICY MATURITY AGE | 100 | 100 |
| CLIENT NAME | JAMES G. POWERS | MARY |
| DOB | 3 / 12   1949 | 4 / 25   1949 |
| AGE | 29 | 29 |
| GENDER | M | F |
| RATING | 1 | 1 |

FIG. 23

INFORCE ILLUSTRATION DATA

| AGE | YEAR | CASH VALUES | DEATH BENEFIT |
|-----|------|-------------|---------------|
|     | 1    |             |               |

*FIG. 25*

PRINTED OUTPUT PAGES AVAILABLE

- CLIENT EXPECTATIONS ASSESSMENT SUMMARY with signature lines
- AGENT POLICY DESIGN GUIDELINES
- SESSION REPORT
- SUPPLEMENTAL ILLUSTRATIONS
- BENCHMARK REPORT
- SINGLE GRAPH
- ILLUSTRATION X vs. BENCHMARK VALUES GRAPH
- MULTIPLE GRAPHS PREMIUM RISK PAGES
- RISK/OPPORTUNITY RATIOS BARCHART
- HI/LOW PREMIUM BARCHART
- HI/LOW DEATH BENEFITS BARCHART
- YOUR RISK TOLERANCE vs. ILLUSTRATION INHERANT RISK BARCHART
- RISK/OPPORTUNITY RATIOS COMPOSITE PAGE
- ILLUSTRATED AND RESCUE PREMIUMS GRAPH

FIG. 29

DYNAMIC POLICY ILLUSTRATION SYSTEM

FIELD OF THE INVENTION

This invention relates generally to the field of computer-based systems regarding insurance information, and more particularly, to a graphical user interface for entering and graphically displaying insurance policy data.

BACKGROUND OF THE INVENTION

The following United States Patents describe various types of computer based systems regarding insurance data: U.S. Pat. Nos. 5,479,344 (Keziah, Jr.); 5,523,942 (Tyler et al.); 4,831,526 (Lucas et al.); 4,975,840 (DeTore et al.); 5,504,674 (Chen et al.); 4,837,693 (Schotz); 4,899,292 (Montagna et al.); and 5,550,746 (Jacobs).

The Keziah, Jr. patent discloses an apparatus for receiving insurance data and for displaying life insurance needs in numerical format.

The Tyler et al. patent discloses a computer implemented graphical user interface for receiving instructions and information relating to insurance. The displays use conventional Window format for entering and displaying numerical data in tabular form.

The Luchs et al. patent discloses a computer system for processing and preparing applications for insurance and premium quotations and for preparing and writing insurance contracts. The displays utilize line displays.

The DeTore et al. patent discloses a method and apparatus for evaluating the insurability of a potentially insurable risk.

The Chen et al. patent discloses a communications network for processing insurance claims of objects.

The Schotz patent discloses a system including a group of computers for facilitating the implementation and administration of a desired group insurance plan.

The Montagna et al. patent discloses a system for storing and retrieving text and associate graphics for insurance estimation or service manuals.

The Jacobs patent discloses a method and apparatus for storing and selectively retrieving product data by correlating customer selection criteria with optimum product designs based on embedded expert judgments.

It should be understood from the outset that the use of the term "illustration" is a term of art describing any numeric, or graphic, interpretation and projection of assumptions of the future values of a life insurance policy.

Two types of illustration software exist on the marketplace. (1) product illustrations and 2) concept illustration software. Both are static, number, time and paper intensive systems.

Current product software calculates policy values and creates a ledger of numbers (generally from 6 to 20 pages in length) which illustrate what a specific insurance company's policy values may look like in the future under a static set of economic assumptions (including Premiums paid in, Interest credited to the policy, Mortality charges, Selling expenses, General expenses, Lapse Rates). Although these illustrations contain footnotes which state that the policy has many "non-guaranteed" assumptions most of the company's specific assumptions are not disclosed to the reader. Thus, it is impossible for the policy buyer to fully understand what the term "non-guaranteed" may mean as it might effect his future policy values.

Using an input screen on a PC or mainframe computer an agent or home office can enter policy input data to create one illustration at a time. The ledger and possibly a graph may be created illustrating this one set of assumptions. If a second set of assumptions is to be considered the input data must be changed or reentered and the ledger pages and graph reprinted. The output of dozens of pages of numbers and or a few graphs can be laid side by side to compare these two possible outcomes. In most cases agents will summarize this data and create a new summary of values to discuss with his client.

The problem with this approach is that it is labor, time and paper intensive and can only cover a very few alternatives. The result is a policy design and buying decision based on a limited number of alternatives considered.

The second type of illustration system in the market transfers the primary illustration data created above, inside the computer to a new platform to illustrate a sales concept rather than a policy per se. This generally requires some type of transfer of data from the main illustration system to a second system where it can be formatted into a variety of sales concepts. All these systems generate a single ledger and series of static graphs which can be used with a client. (Most of these systems also require the printing and delivery to client of all the pages from the basic illustration and footnotes mentioned above.)

The following companies sell software programs that fall in the above categories and which calculate life insurance policy data, print out numbered illustrations and/or present static graphic depictions: Fipsco of Des Moines, Ill.; United Systems of Park City, Utah (INTEFLEX); FDP of Miami, Fla.; and Insmark of San Ramon, Calif.

Thus, there remains a need for a system that allows the user to rapidly vary assumptions and view a dynamic illustration of future values of an insurance policy. In addition, there remains a need for a system that creates a model policy based on industry standards instead of being based on a single company's internal assumptions. Furthermore, although the investment industry has created some tools in the form of questionnaires that attempt to establish a client's risk tolerance and investment objectives (e.g., there are a number of asset allocation software systems in use today that allow the user to answer a series of questions on a computer with the computer displaying a recommended allocation among a group of investment accounts such as the Provident Mutual Asset Allocation package designed for variable life insurance), there appears to be nothing equivalent for decision-making about life insurance policies.

OBJECTS OF THE INVENTION

Accordingly, it is the general object of this invention to provide an apparatus which addresses the aforementioned needs.

It is a further object of this invention to provide an insurance calculator that demonstrates to the user the interaction of risk elements of a life insurance policy.

It is another object of this invention to provide an insurance calculator that demonstrates to the user how changing at least one variable in the life insurance policy affects the future values.

It is a further object of this invention to provide an insurance calculator to help agents and clients establish realistic expectations for policy performance which is not guaranteed.

It is yet another object of this invention to demonstrate the actual tradeoffs between premiums and values.

It is yet another object of this invention to provide a graphic depiction of both the current policy illustration as well as the guaranteed values of the policy at the same time in the same display screen.

It is still yet a further object of this invention to provide a policy illustration system that illustrates the effect that multiple non-guaranteed factors have on an illustration in a rapid series of recalculated graphs which illustrate any assumptions the user may wish to see in rapid succession.

It is even yet a further object of this invention to provide an illustration system having an illustration screen that changes so that a motion picture effect occurs, thereby allowing the user to see many alternatives quickly.

It is still yet even a further object of this invention to provide a policy illustration system through which the user can reset any single assumption, view the outcome, or set a range of changing assumptions and view the progression of the policy from one point to another point.

It is yet even another object of this invention to provide a policy illustration system that permits the user to have a computer correct any of a number of variables to create an illustration which stays in force for life.

It is still yet another object of this invention to provide a policy illustration system that permits entry of, and utilization of, generic policy assumptions or customized specific company assumptions.

It is even yet another object of this invention to provide a policy illustration system that creates a model policy based on industry standards instead of a single company's internal assumptions.

It is still yet a further object of this invention to provide a policy illustration system that can input client specific data to any particular insurance company's existing insurance policy calculation program.

It is still another object of this invention to create an interactive process using a questionnaire, inferences and feedback for educating the user about life insurance and thereby leading the user to the most suitable life insurance policy selection based on his/her responses.

It is even yet a further object of this invention to provide a link between conventional financial planning software and the dynamic policy illustration system of the present invention.

It is still yet a further object of this invention to provide a link between conventional investment asset allocation software for variable life insurance and the dynamic policy illustration system of the present invention.

It is even another object of this invention to provide a link between conventional current insurance policy illustration software and the dynamic policy illustration system of the present invention.

SUMMARY OF THE INVENTION

These and other objects of the instant invention are achieved by providing an apparatus for dynamically displaying future values of a life insurance policy data in graphical format. The apparatus comprises a computer including a memory and a processor, a monitor display coupled to the computer for dynamically displaying the insurance policy data in the graphical format, and an input means coupled to the computer for inputting variables related to the insurance policy data into the computer by a user. The memory includes an insurance calculation means, operable by the processor, for using the variables in a plurality of calculations to create the future values. The memory also includes a graphical user interface, operable by the insurance calculation means, for providing the insurance policy data in line graphs, area graphs, and bar graphs to the monitor. The memory also includes a charting means for combining the line graphs, area graphs and bar graphs into a single screen display on the monitor. The insurance calculation means controls the graphical user interface according to a range of values, adjustable by the user via the input means, of the at least one variable to generate a continuously changing display of the line graphs, area graphs and bar graphs in the single screen display for demonstrating the effects of modifying the at least one variable.

DESCRIPTION OF THE DRAWINGS

Other objects and many of the attendant advantages of this invention will be readily appreciated as the same becomes better understood by reference to the following detailed description when considered in connection with the accompanying drawings wherein:

Figure 8:
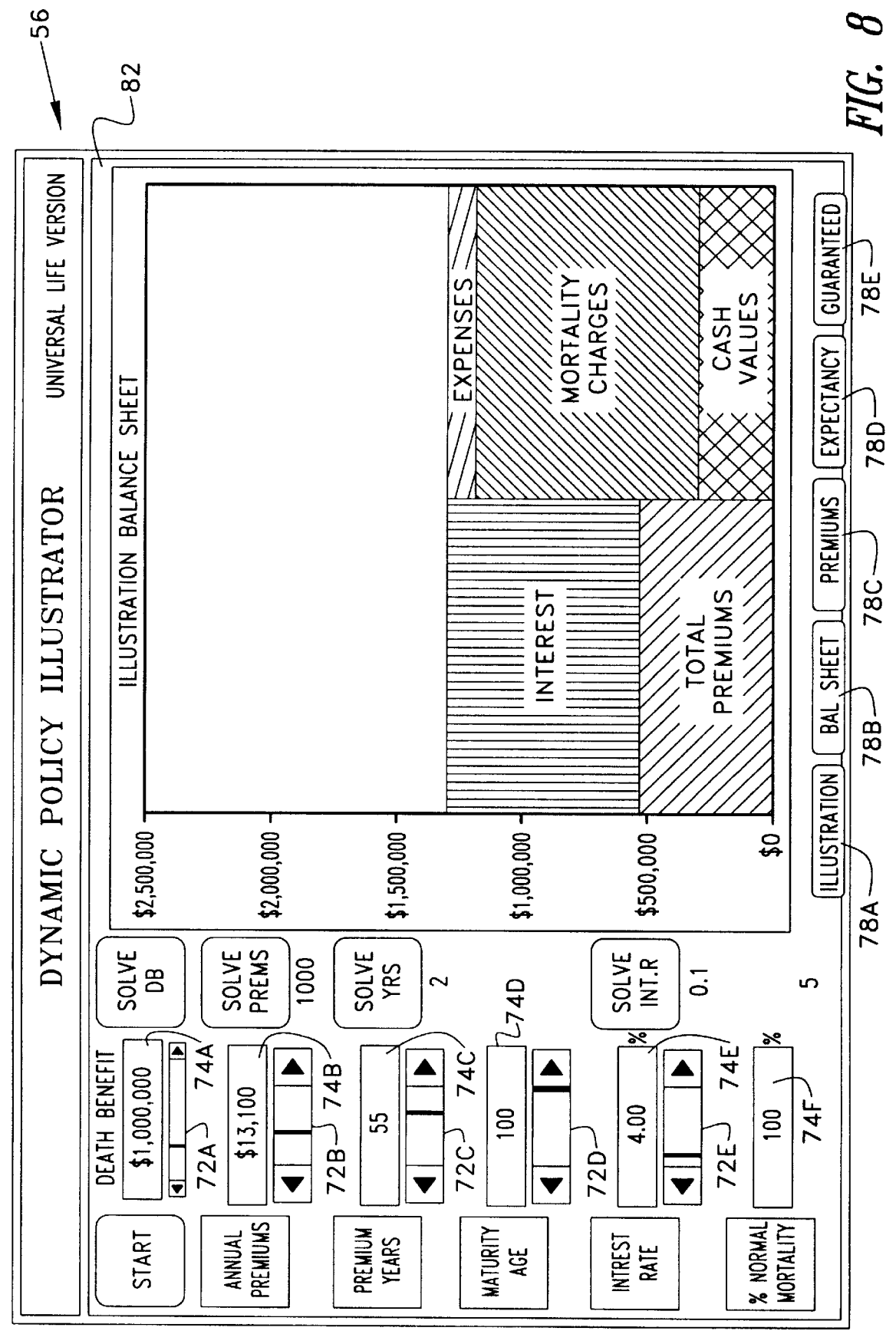

FIG. 8 is a DICS main screen display of a balance sheet corresponding to FIG. 4;

FIG. 16 is a display of the risk/opportunity ratios in accordance with FIGS. 3–6;

FIGS. 17–18 are a bar graph displays which depict the upside and downside possibilities of the user's premium input choices.

FIG. 19 is a tabular form of FIGS. 16–18;

FIG. 22 is the agent input data;

FIG. 23 is the client input data;

FIG. 25 is the in-force illustration data used as input for the in-force illustration;

FIG. 29 is block diagram of the printed output available in the present invention;

DESCRIPTION OF THE PREFERRED EMBODIMENT OF THE INVENTION

Figure 1:
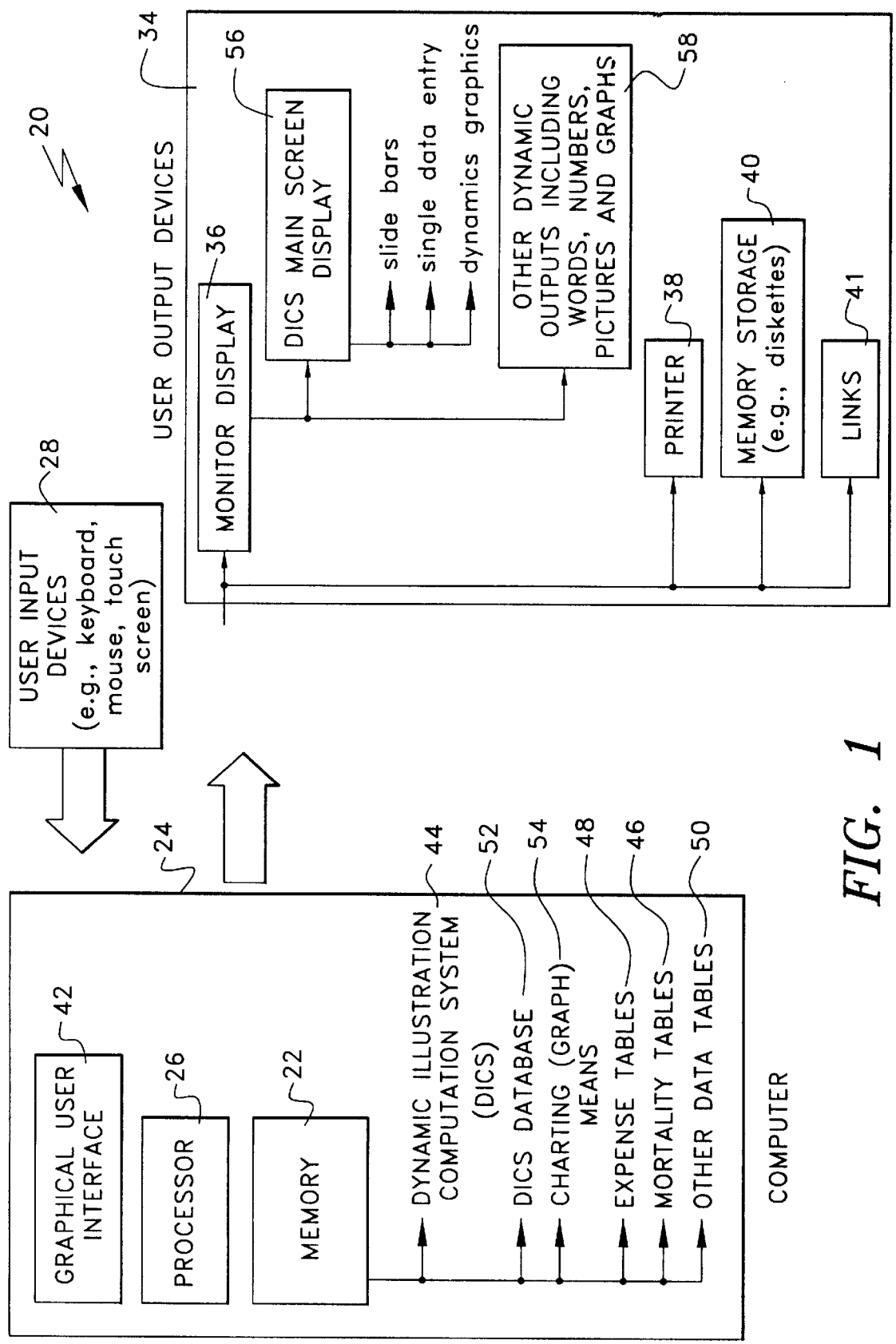
FIG. 1 is a block diagram of the present invention.
Figure 2:
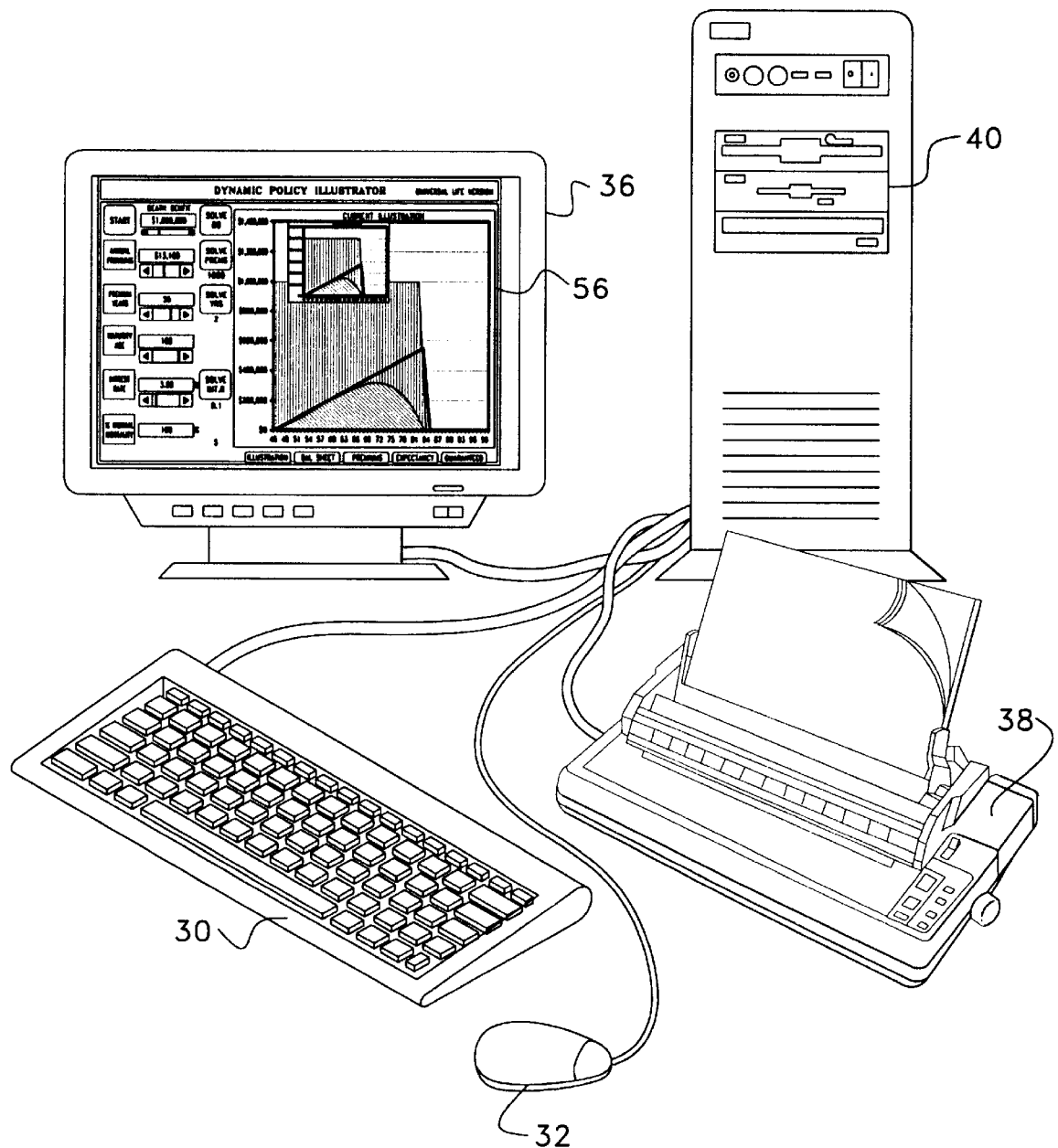
FIG. 2 is a view of a computer for supporting the present invention.

Referring now in greater detail to the various figures of the drawing wherein like reference characters refer to like parts, a dynamic policy illustration system (DPIS) constructed in accordance with the present invention is shown generally at 20 in FIG. 1.

The DPIS 20 basically comprises software that forms a portion of the memory 22 (e.g., compact disk, hard drive, diskette, etc.) of a computer 24 having a processor 26 (preferably an Intel 386 or above). The computer also comprises input means 28, e.g., keyboard 30 or mouse 32. In addition, the computer 24 comprises output means 34 such as a monitor 36, a printer 38, diskette drive 40 or any type of communication link 41 (e.g., a computer network, or the Internet). The computer also comprises a graphical user interface 42 (e.g., Microsoft WINDOWS or Apple MACINTOSH, etc.) for permitting the graphic interface for both input to and output from the computer 24.

The core of the DPIS 20 comprises the dynamic illustration computation system (DICS) 44. The DICS 44 comprises all of the insurance calculations necessary for determining the future values of a life insurance policy illustration. The calculations used in the DICS 44 are conventional and, as such, are not described in detail here. In addition, the DICS 44 uses data from mortality tables 46, expense tables 48 and other data tables 50 that are well-known in the art for precisely calculating the future values of a life insurance policy; these tables reside in the memory 22 of the computer 24. Furthermore, the DICS 44 utilizes a DICS database 52 for storing data such as the session notes (information and responses by a user during a session), sequences of the tour (to be discussed later) and the "how, why, what, etc." responses that the user inputted (also to be discussed later). The DICS 44 also utilizes a charting means 54 (e.g., Microsoft Excel, Visual Basic or C++program language) for creating the graphs used in the displays, to be discussed later.

Figure 3:
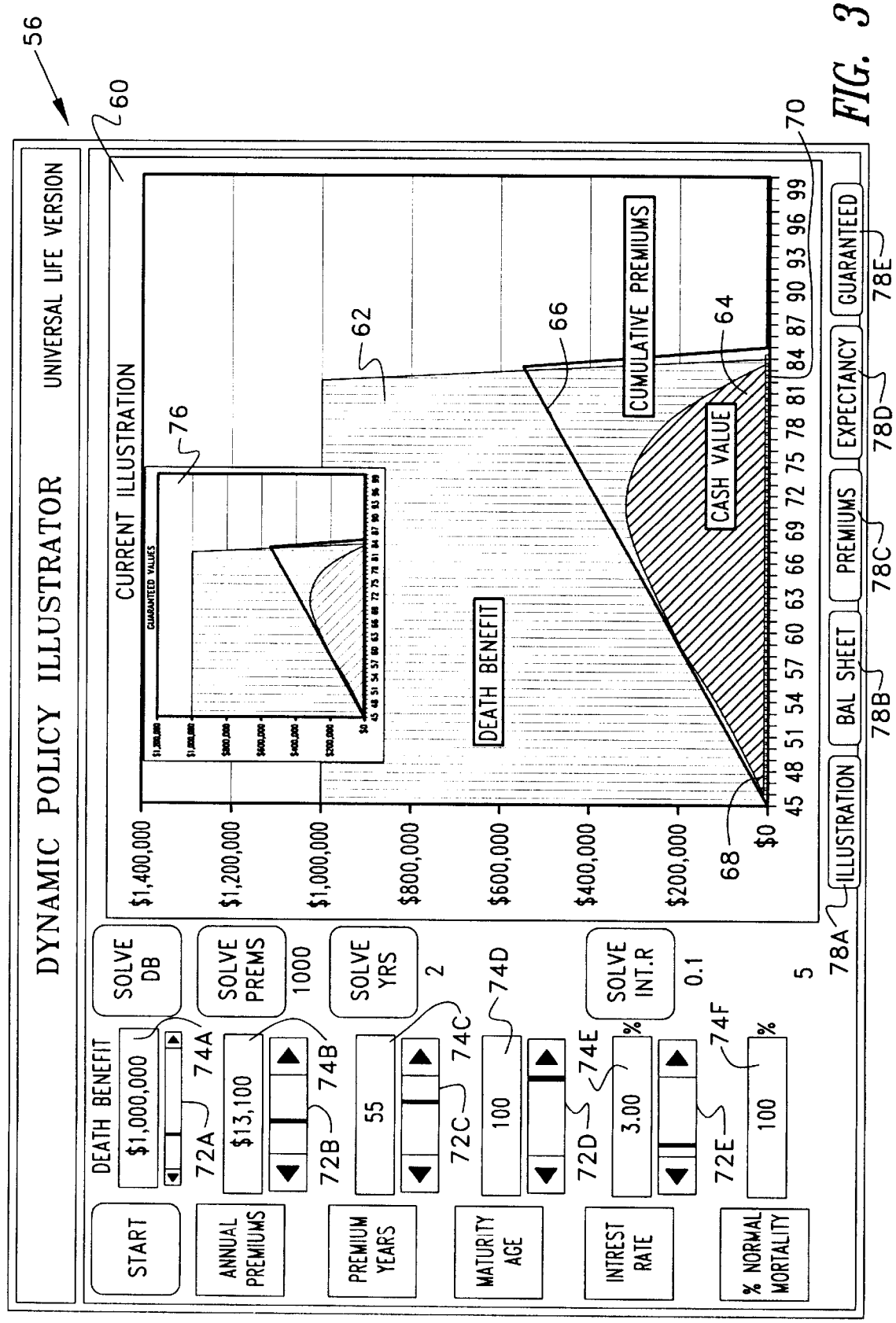
FIG. 3 is a DICS main screen display of a current illustration depicting a life insurance graphics and data at 3% interest rate.
Figure 4:
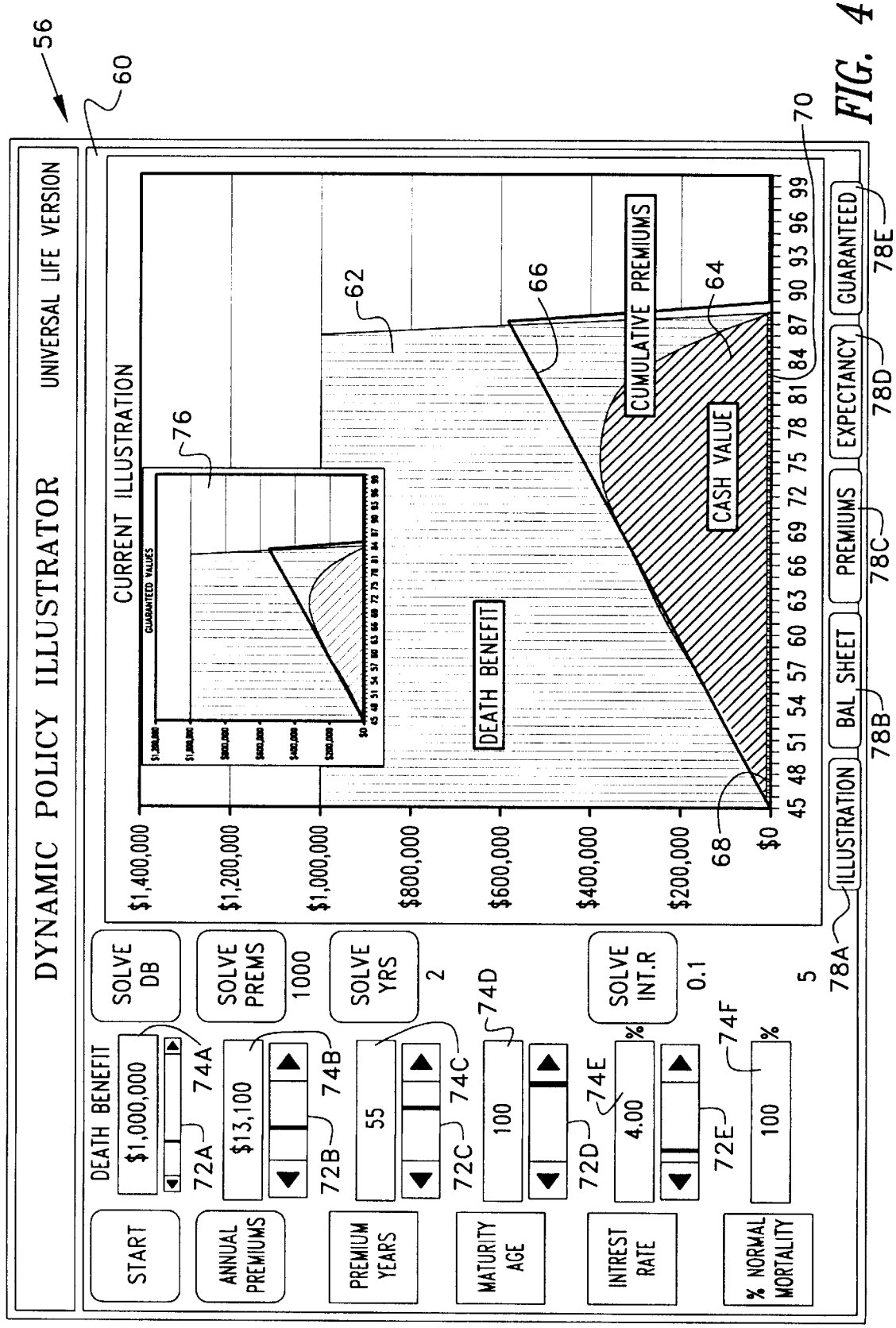
FIG. 4 is a DICS main screen display of a current illustration depicting the life insurance graphics and data of FIG. 3 at 4% interest rate.
Figure 5:
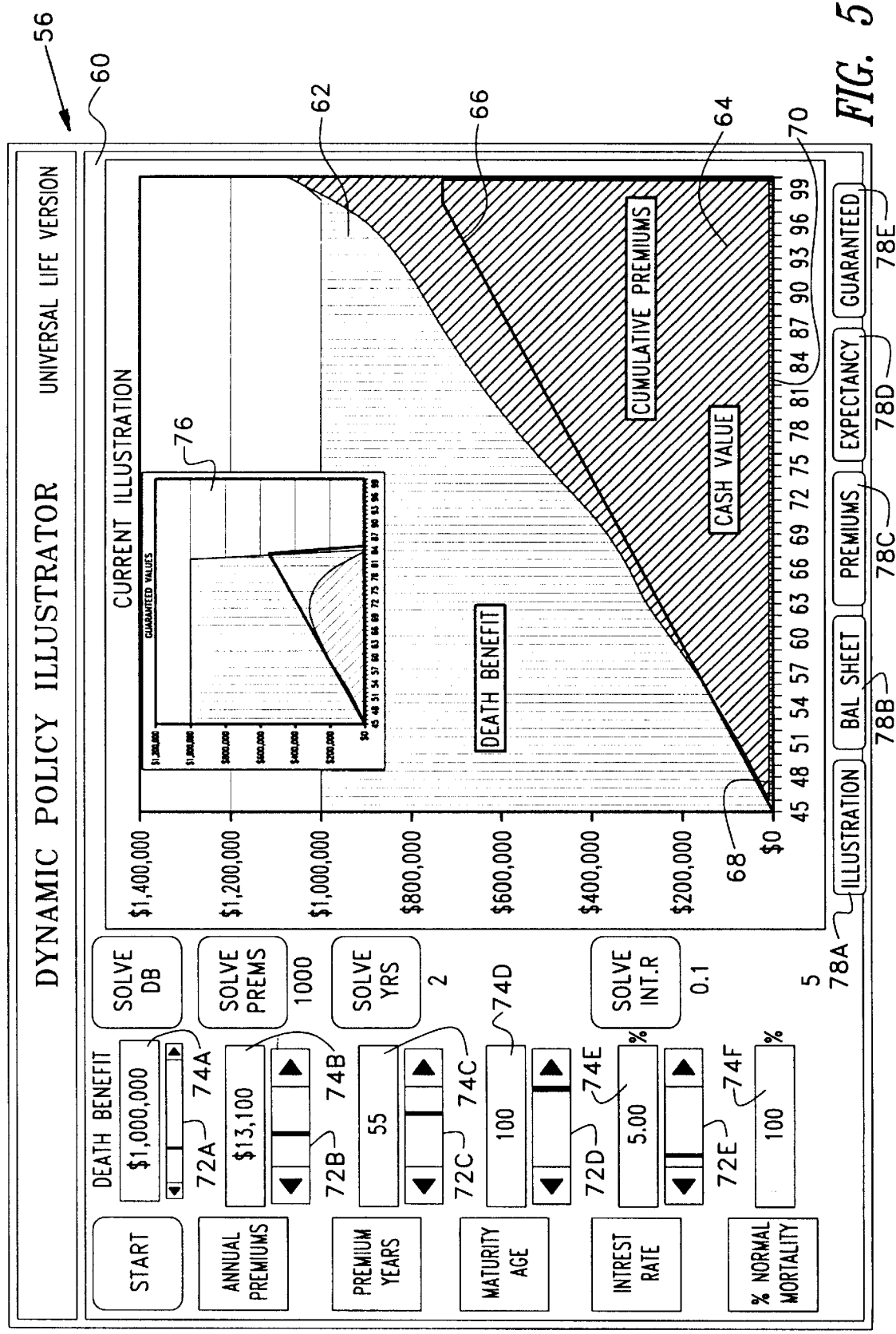
FIG. 5 is a display of a DICS main screen display of a current illustration depicting the life insurance graphics and data of FIG. 3 at 5% interest rate.
Figure 11:
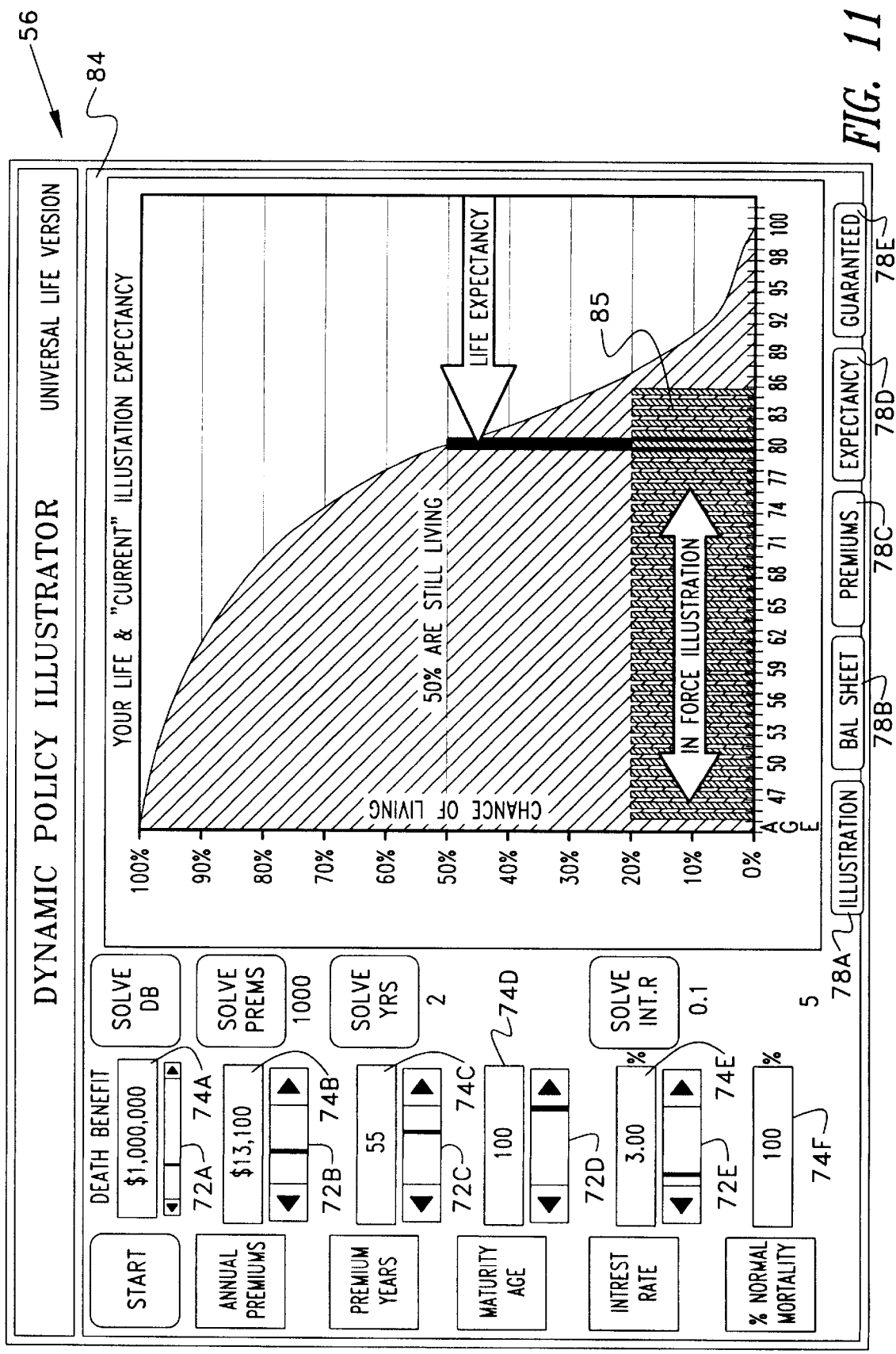
FIG. 11 is a DICS main screen display of the actuarial chances of remaining alive corresponding to FIG. 3.
Figure 12:
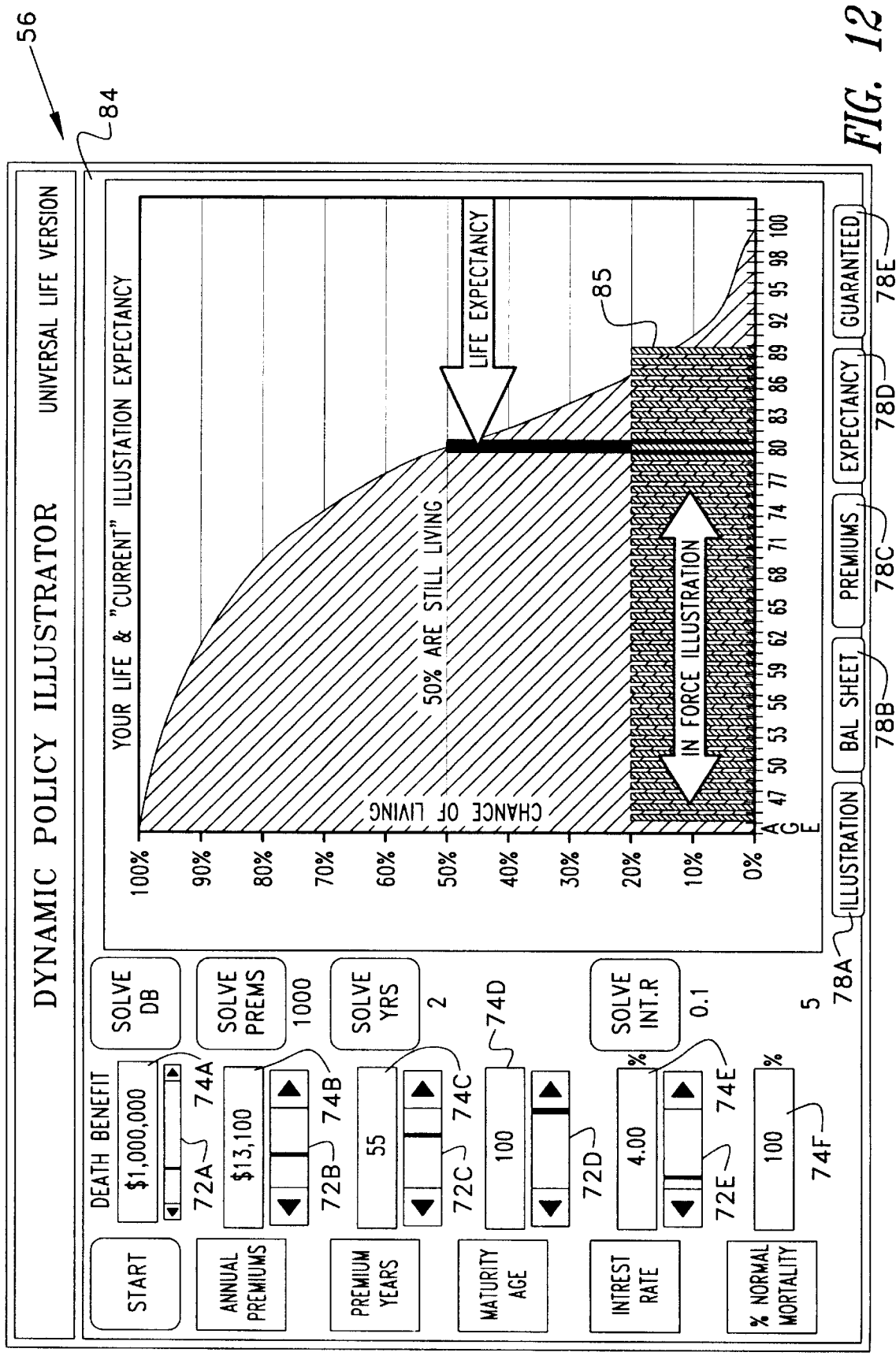
FIG. 12 is a DICS main screen display of the actuarial chances of remaining alive corresponding to FIG.4.
Figure 13:
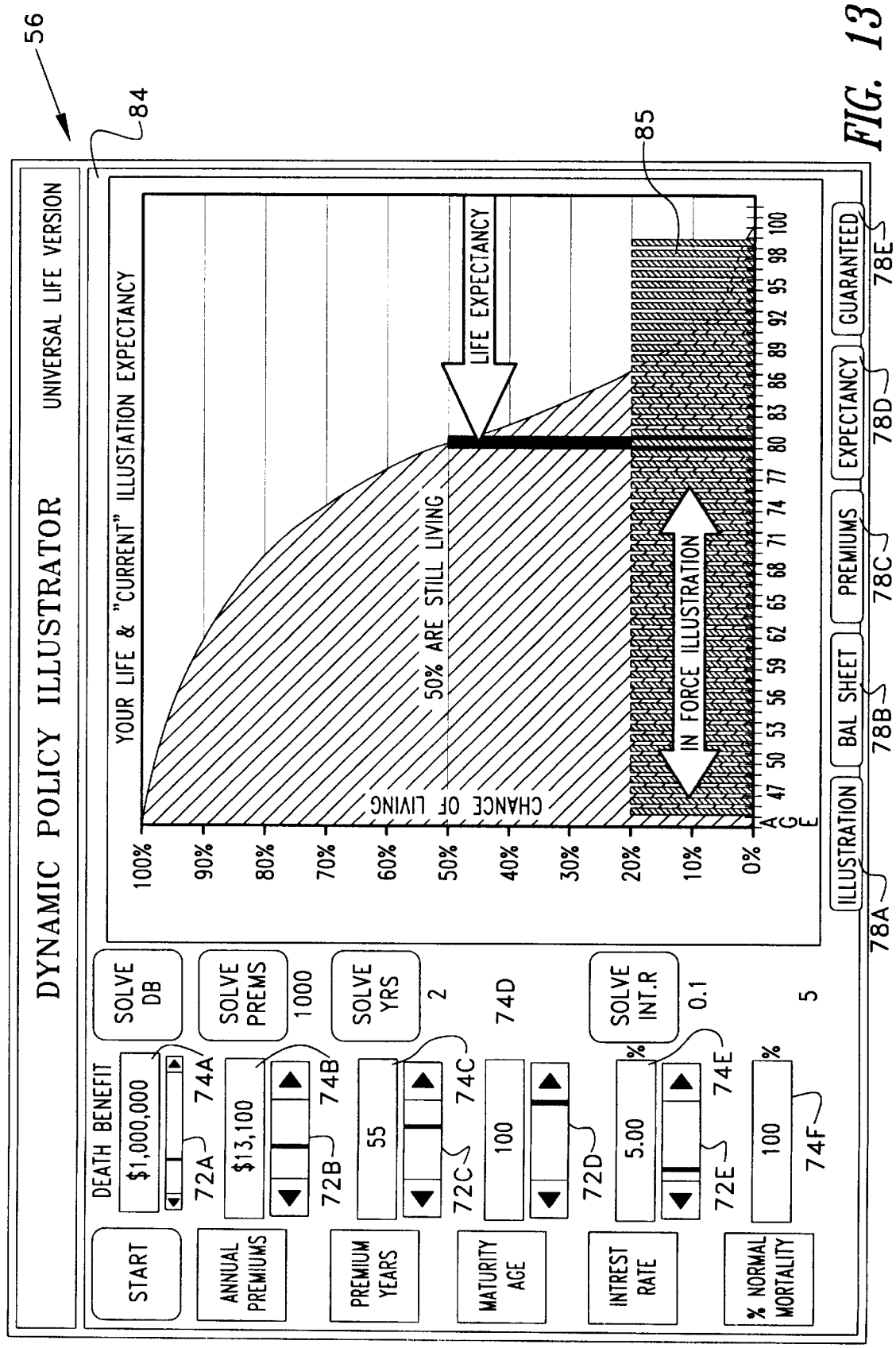
FIG. 13 is a DICS main screen display of the actual chances of remaining alive corresponding to FIG. 5.
Figure 14:
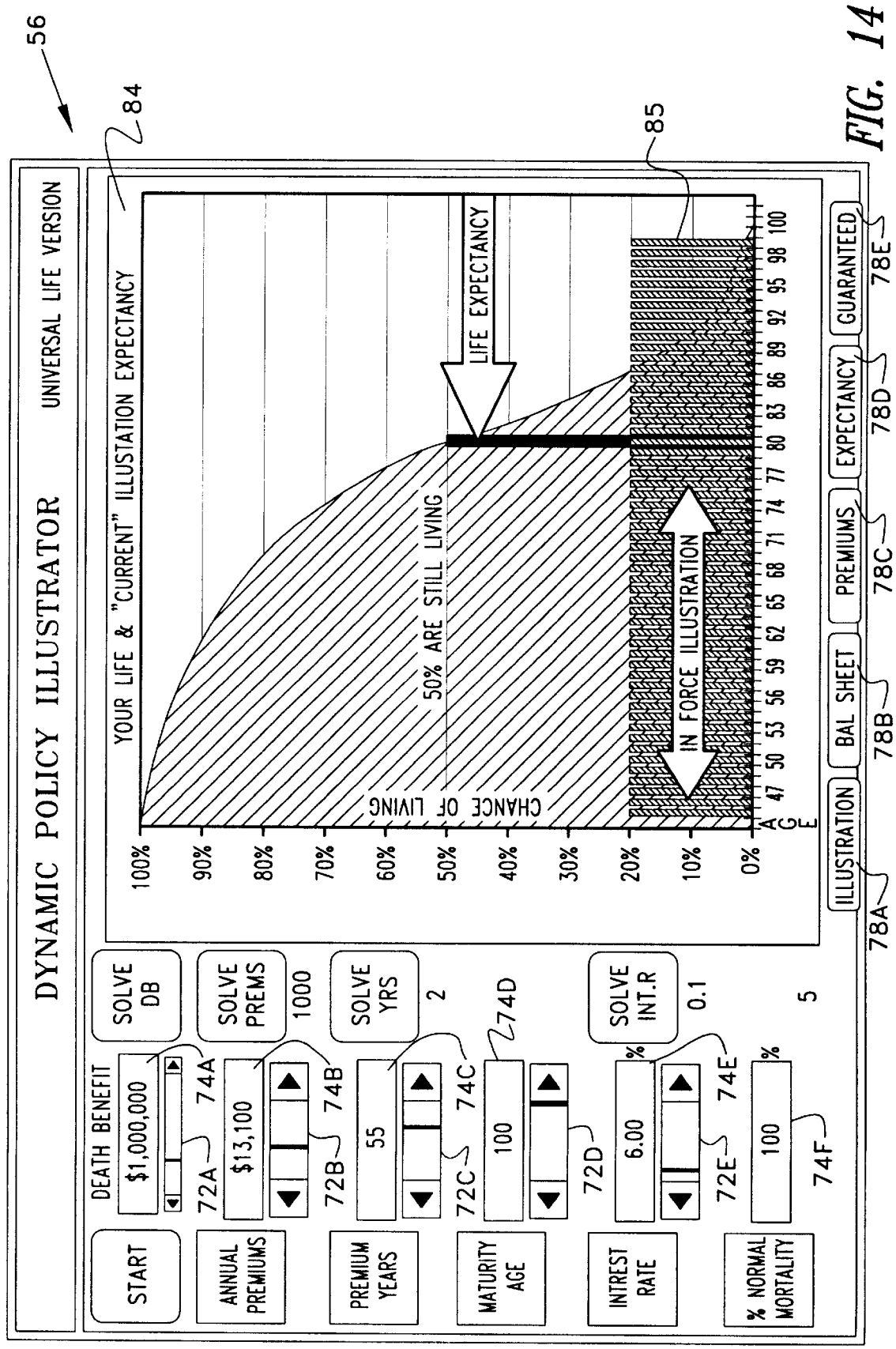
FIG. 14 is a DICS main screen display of the actuarial chances of remaining alive corresponding to FIG. 6.
Figure 15:
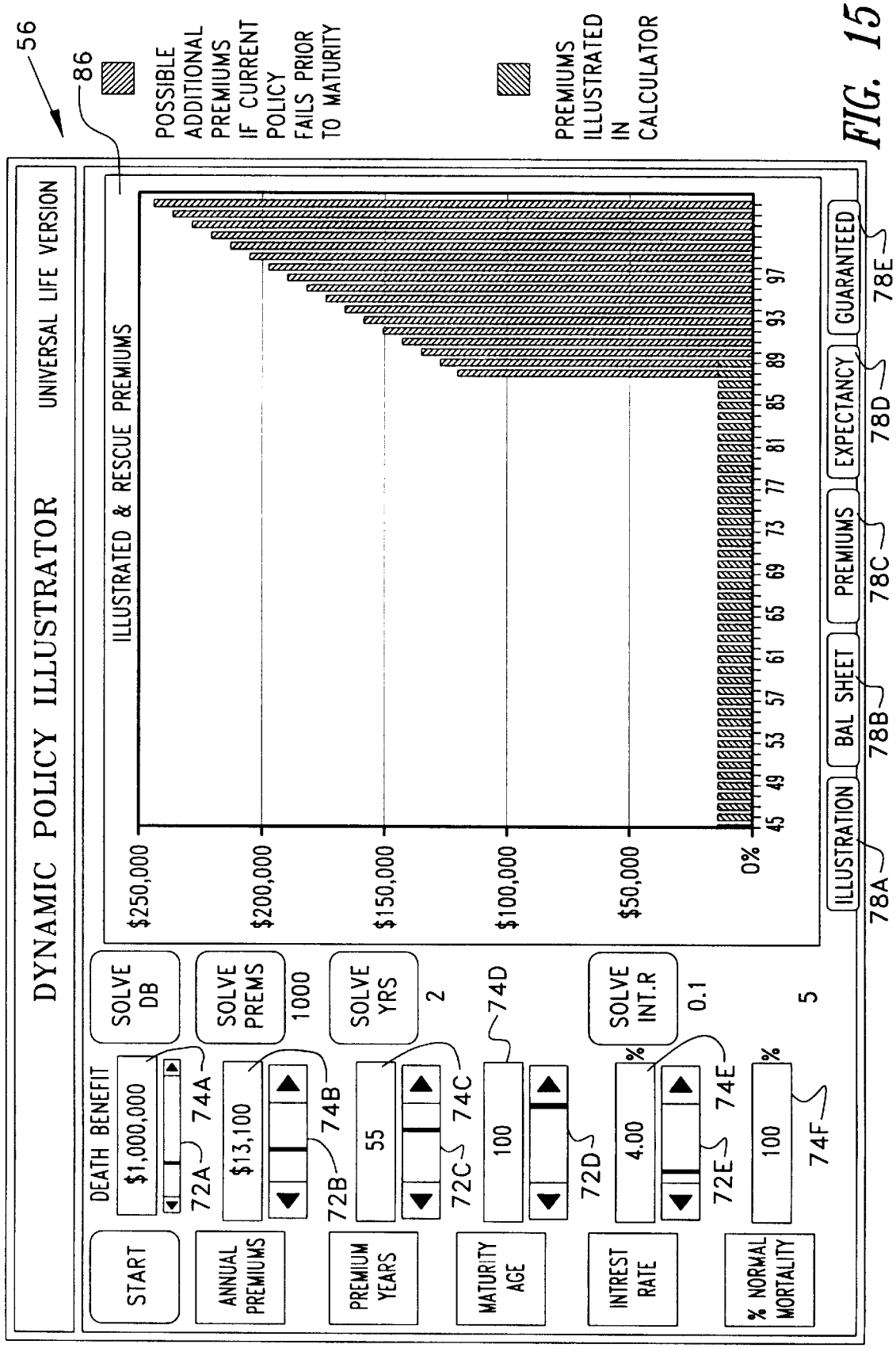
FIG. 15 is a DICS main screen display of the illustrated and rescue premiums.
Figure 20:
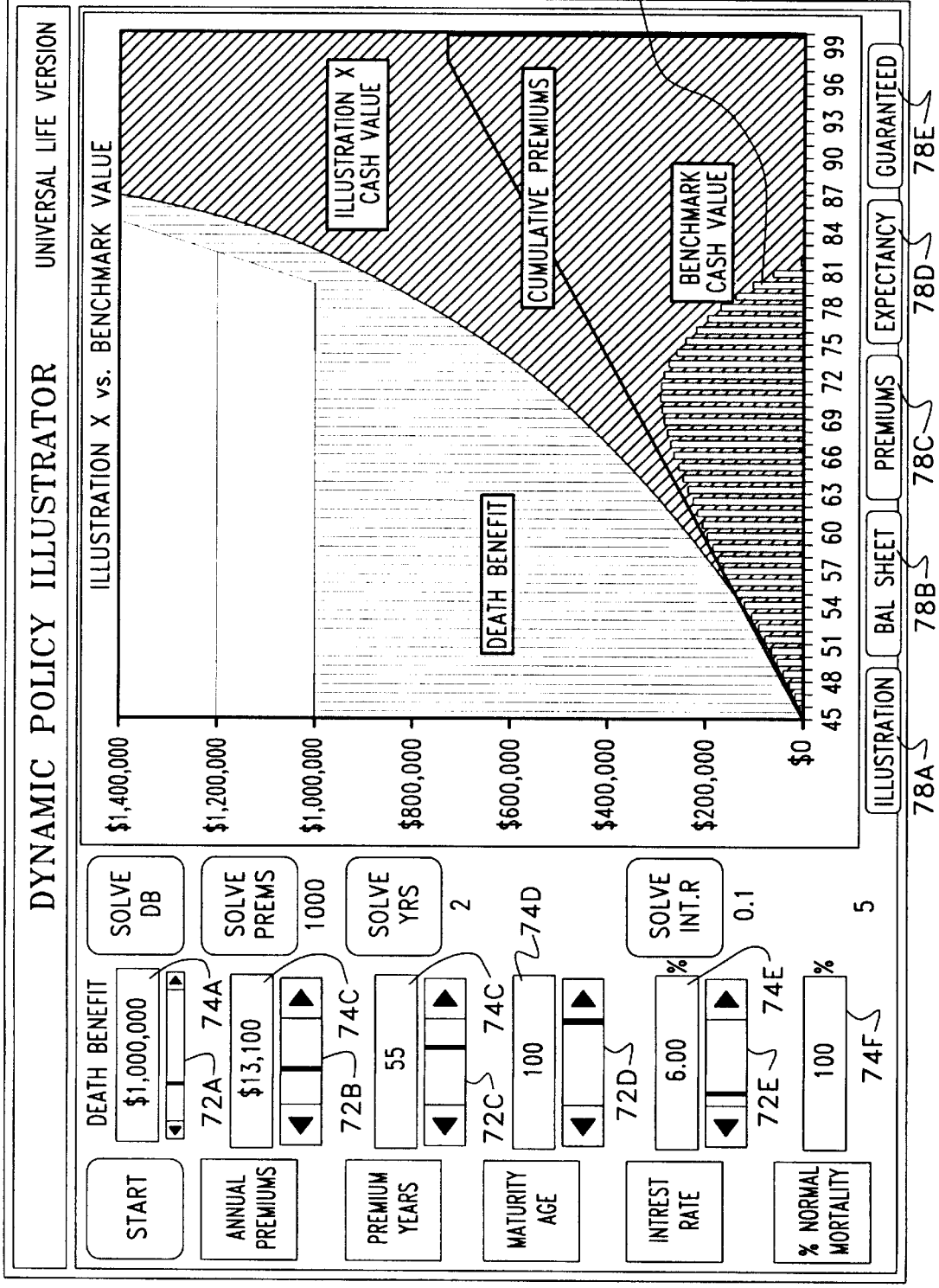
FIG. 20 is a display of a policy illustration X versus benchmark values.

The DPIS 20 dynamically demonstrates the interaction of the risk elements of a life insurance policy illustration. This is achieved by providing a DICS main screen display 56 (FIGS. 3–15, 20) and other displays 58 (FIGS. 16–19, 22–25). The DICS main screen display 56 includes a current illustration screen display (FIG. 3) a life insurance balance sheet display (FIG. 7), a "Your life and current Illustration expectancy" display (FIG. 11), an illustrated and rescue premiums display (FIG. 15), and an illustration X vs. benchmark values display (FIG. 20). The other displays 58 include a risk/opportunities ratios display (FIG. 16), a high/low premiums display (FIG. 17), a high/low insurance death benefit display (FIG. 18), a tabular form of FIGS. 16–19 (FIG. 19), and data input screens (FIGS. 22–25).

Of all of the displays in the DPIS 20, the DICS main screen display 56 (FIGS. 3–15, 20) is the most important. The DICS main screen display 56 provides a view screen which instantly displays a color graph of the future values of the policy illustration generated by the current input assumptions, also known as variables. The client (hereinafter "user") can enter, or modify, these variables that effect policy performance and instantly view the effect on future policy values over his/her lifetime. As shown in FIGS. 3–6 (or FIGS. 7–10 or 11–14), by manipulating slides bars or dials the user can move the main screen 56 through a dynamic succession of variables to gain an understanding of how a policy might be effected by changes in one or more variables. This progression of the main screen 56 through a dynamic succession of variables is hereinafter referred to as incremental solve (e.g., FIGS. 3–6). The increments of the variable that is being modified can be preset by the user.

Figure 6:
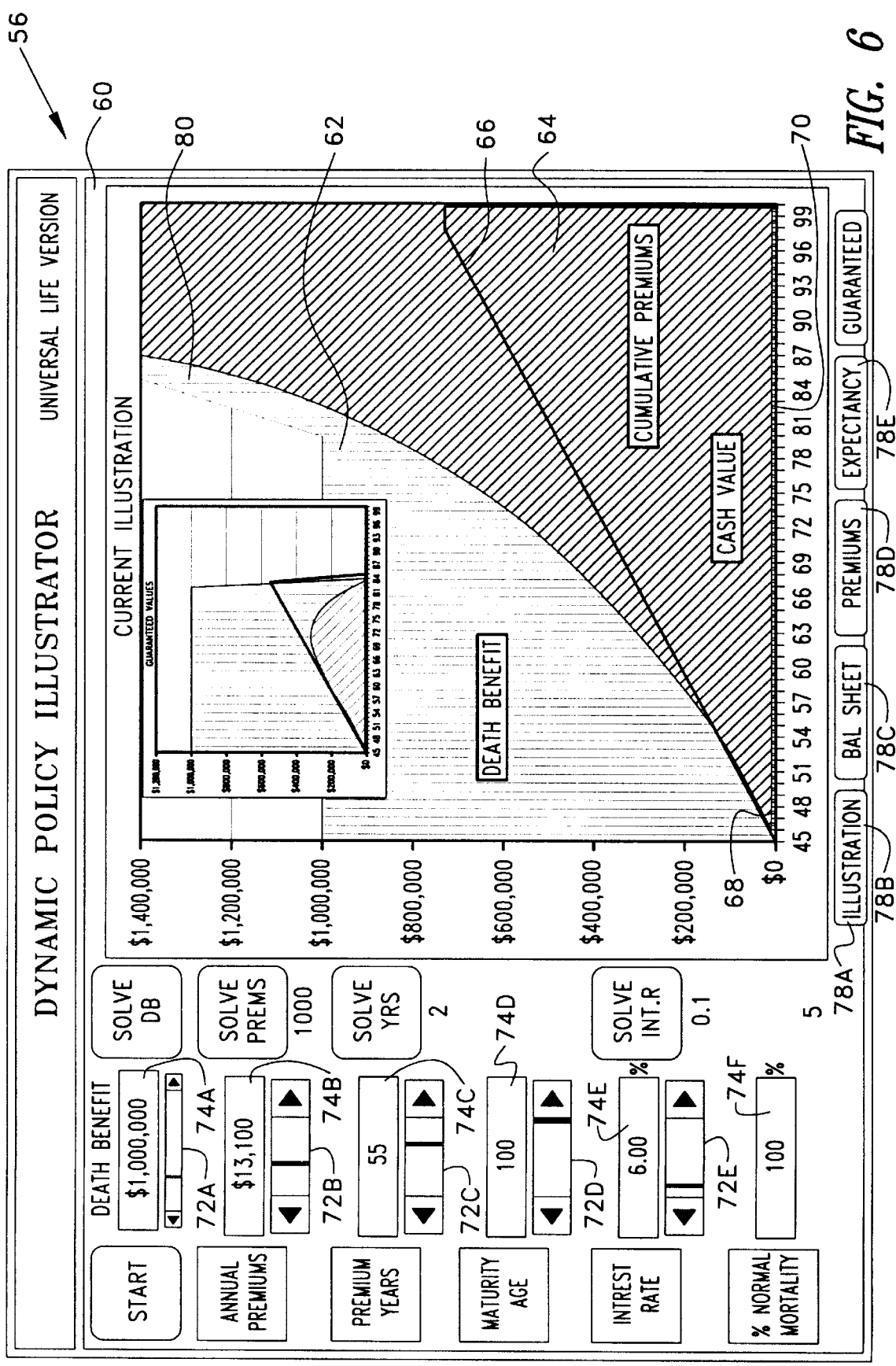
FIG. 6 is a DICS main screen display of a current illustration depicting the life insurance graphics and data of FIG. 3 at 6% interest rate.
Figure 7:
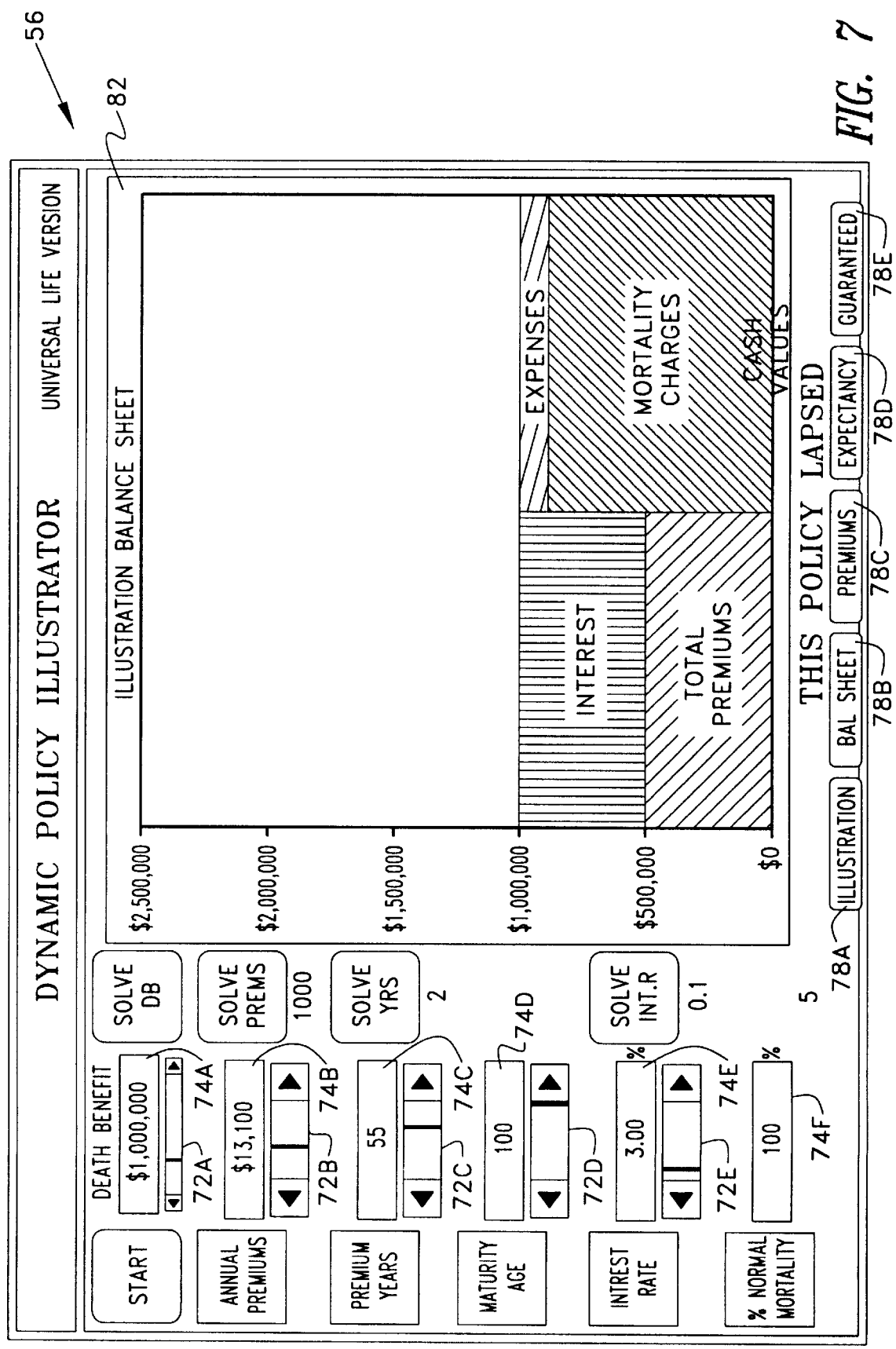
FIG. 7 is a DICS main screen display of a balance sheet corresponding to FIG. 3.
Figure 9:
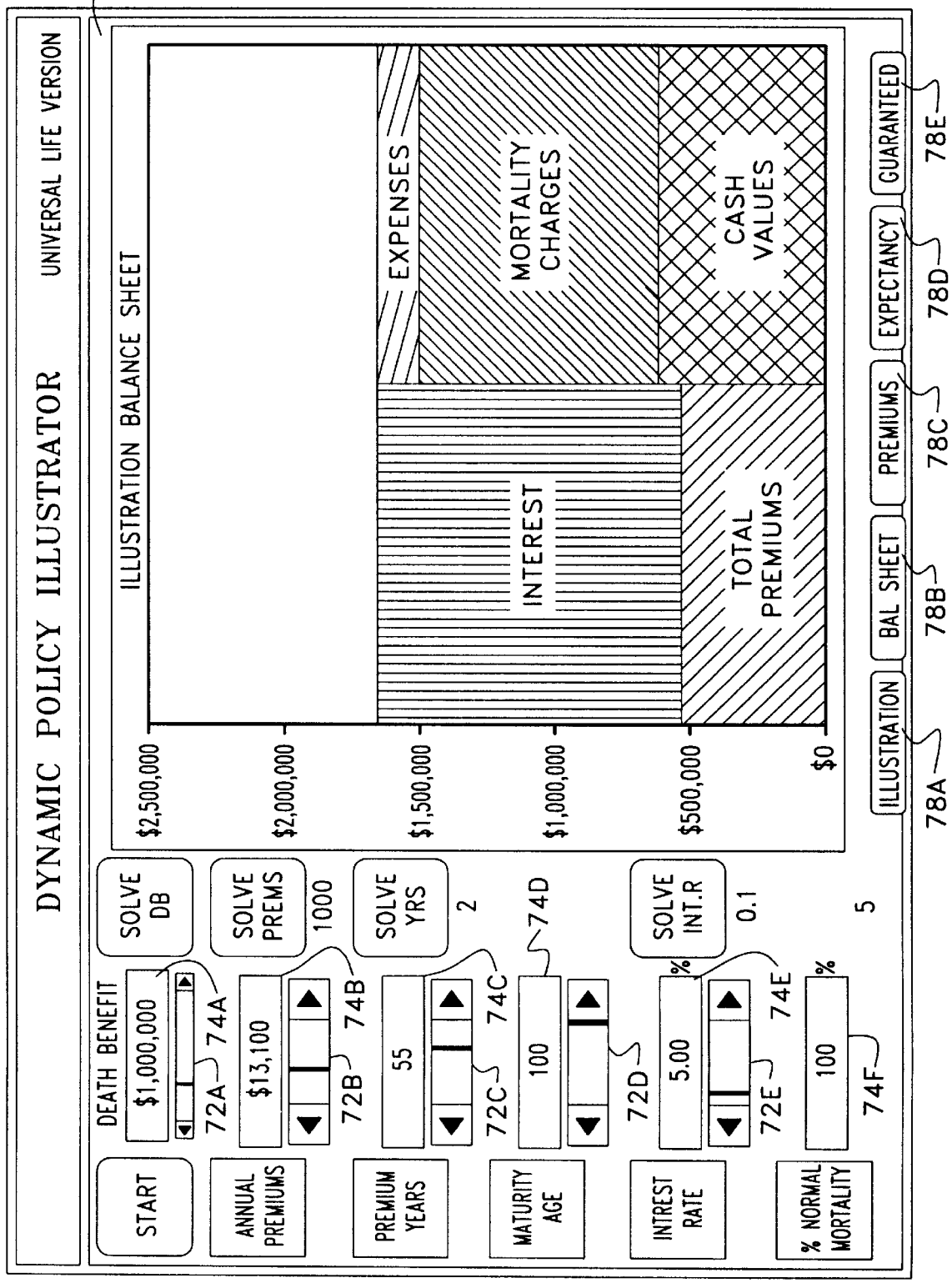
FIG. 9 is a DICS main screen display of a balance sheet corresponding to FIG. 5.
Figure 10:
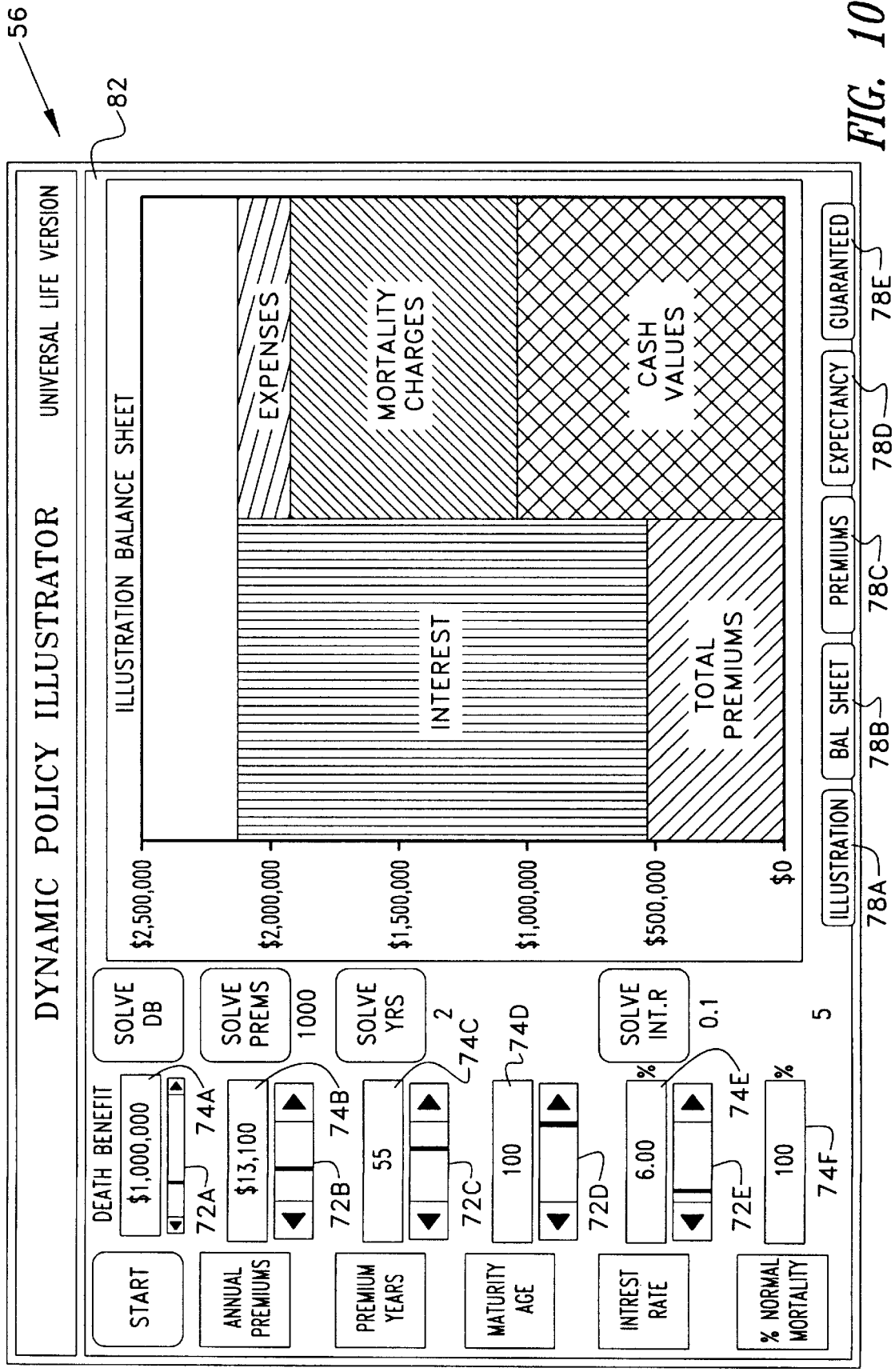
FIG. 10 is a DICS main screen display of a balance sheet corresponding to FIG. 6.

Alternatively, the user has the option of having the main screen 56 jump directly to the solved policy, i.e., go directly to FIG. 6, hereinafter known as instant solve. The user can ask the DICS 44, via the main screen 56, to compute any single variable needed to solve the policy to age 100 or an earlier maturity age. A policy is "solved" when its cash values equal the death benefit at this age 100 or maturity age. By looking at the performance required by single elements (e.g., premiums, mortality expenses, general expenses or cash values) to solve for a successful long term policy the user gains an understanding of how much risk may be inherent within the set of assumptions he has entered. For example, if a user entered a set of policy assumptions and solved for mortality rates (i.e., the charges to cover the chance of death each policy year) one might find that keeping this policy in force over his/her lifetime would require the insurance company to assume that "people come back to life." That is, instead of charging people for insurance, insurance companies would have to start crediting people for owning the policies, an unlikely possibility. Therefore, one might conclude that the other policy factors, such as premiums paid in, are just too optimistic and should be adjusted to a more reasonable expectation.

It should be noted that the use of color in these display screens 56 and 58 greatly assists in graphically depicting to the user the various characteristics of the proposed policy, both statically and dynamically. For example, in the main screen displays 56, such features as the death benefit are depicted as a blue area, the cash value as a green area, the annual premiums as small red blocks coincident with the horizontal axis of the policy illustration and the cumulative premiums as a steadily increasing red line. When the increment solve is executed, the user can see the different characteristics change in color as well as in shape.

The main screen displays 56 (FIGS. 3–15, 20) are graphics generated by a charting means, e.g., Microsoft Excel, which combines line, area and bar graphs into a single picture. One of the main screen displays 56 is known as the Current Illustration 60 (FIGS. 3–6). During increment solve, the Current Illustration 60 recycles rapidly to demonstrate a motion picture effect of the incremental changes in policy values through a range of values. For example, as shown in FIGS. 3–6 there is depicted a graphic sequence as the interest rate is varied from 3% to 6%. Over a few seconds the main screen 56 would then display a moving picture (of approximately 50 changes) of the changing graphic results in the policy's premiums, cash values and death benefits resulting from these differing interest rates. The Current Illustration 60 depicts the death benefit 62 (e.g., blue area) the cash value 64 (e.g., green area) on a plot of value vs. age of policyholder. In addition, the cumulative premiums 66 (e.g., red line) are depicted while showing the annual premiums 68 (e.g., red squares) along the horizontal axis 70. When the increment solve is executed, these characteristics vary, as shown in FIGS. 3–6.

The main screen 56 also comprises a plurality of slide bars 72A–72E for modifying a respective variable and corresponding data fields 74A–74F for displaying the current value of the variable. Current variables that can be entered by the user include: client age, gender and rating class, second insurance age, gender and rating class, face value of the life insurance policy, type of policy (e.g., universal life, whole life, variable life), annual premiums, number of years premiums are paid, maturity age (for the policy), interest rate, mortality table percentage, sales expenses, general expenses, observation year. As shown in FIGS. 3–6, only five of the current variables are displayed (namely, annual premiums, premium years, maturity age, interest rate, and the mortality rate). However, the remaining variables are available to the user and can be displayed on the main screen 56, or on a pop-up screen (not shown), if desired.

In addition, the Current Illustration 60 also comprises a guaranteed values illustration 76 that forms an inset in the Current Illustration 60. The guaranteed values illustration 76 is a worst case scenario, i.e., it is a plot of the future values that assumes maximum mortality, maximum expenses and minimum interest with all of the other variables being maintained. This novel display of the Current Illustration 60 and the guaranteed values illustration 76 provides the user with an instant means of comparing the worst case performance of his/her policy with modified values.

The main screen 56 also includes buttons 78A–78E for moving to the indicated full screen displays. For example, selecting the ILLUSTRATION button 78A causes the monitor 36 to display a full screen of the Current Illustration 60 only. Selecting the BAL SHEET button 78B causes the display of FIG. 7 to appear. Selecting the PREMIUMS button 78C causes the display of FIG. 15 to appear. Selecting the EXPECTANCY button 78D causes the display of FIG. 11 to appear. Selecting the GUARANTEED button 78E causes the monitor to display a full screen of the guaranteed values only.

Another novel display of the Current Illustration 60 is that the corridor 80 is now graphically depicted for the user. The corridor 80 represents the requisite amount of death benefit that must exceed the cash value whenever the cash value approaches the death benefit, as shown most clearly in FIG. 6.

Another screen display, known as the Illustration Balance Sheet 82 (FIG. 7), graphically displays the cumulative values in any observation year of five policy factors: premiums, interest, mortality expenses, general expenses, cash values. In particular, a graphic sequence of the illustration balance sheet is shown in FIGS. 7–10, which correspond to the graphic sequence of FIGS. 3–6. This enables the user to understand the cumulative effects of these five elements which account for all of the cash flow within a life insurance policy. By viewing a policy over time, the user can see the relative importance that each of these factors has in the performance of the policy. Thus, the user gains an understanding of why policies succeed and fail.

Alternatively, the balance sheet view screen 82 can also be viewed with single static assumptions.

Another screen display, known as Your Life & Current Illustration Expectancy (FIG. 11) 84, displays an area graph of the actuarial chance of still being alive at each age from the present to age 100. It displays a vertical line at the point of "life expectancy"; the age when 50% of those starting out in the user's risk group have died and half are still living. There is also a set of bars 85 that appear along the bottom quarter of the graph indicating how long the current illustration remains in force. The user can then compare his/her life expectancy and chance of living to the illustrated life of the Current Illustration 60. This screen display 84 dynamically changes as variables such as age, sex or rate class are altered. In particular, as can be seen in FIGS. 11–14, which correspond to FIGS. 3–6, the in-force policy 85 becomes extended as the interest rate changes from 3% to 6%.

Another screen display, known as Illustrated & Rescue Premiums (FIG. 15) 86, depicts illustration risk by considering the level of premiums which might be required to continue a policy in force to age 100 if the insured lives a long life and does not die on schedule (i.e., at life expectancy). This screen display 86 corrects for premiums in a unique way. It allows the policy to nearly lapse and then illustrates the premiums required to keep the policy in force from then to age 100. This gives the user a sense of what a "worst case", "exploding" premium schedule might look like. If the user is uncomfortable with this possibility, the user can reenter a premium schedule for early years which will eliminate this "exploding" premium risk.

In conjunction with the display 84, there are two sets of bar graphs (FIGS. 17–18) which display the possible up and downside possibilities of the user's premium input choices. In particular, as shown in FIGS. 17–18, the high premiums are based on "guaranteed" or near-guaranteed values needed to produce the selected death benefit. The low premiums are based on using "current" interest and mortality rates to produce the selected death benefit. The high insurance death benefits are based on paying all scheduled premiums at "current" interest and mortality rates. The low insurance death benefits are based on the same premiums schedule but using "guaranteed" interest and expenses to calculate the death benefit. In many cases the policy will lapse before age 100 under this assumption. For example, if the user were to enter low early premiums, the user may see that not only can the premiums rise very high in the future but also the insurance will never provide a death benefit greater than when the user began. On the other hand, if the user pays higher early premiums the user will never face an increasing premium or a reducing death benefit but may receive an increasing death benefit at older ages. This demonstrates the risk taken by a lower initial premium and the opportunity gained by the higher premium.

A risk ratio and opportunity ratio (FIG. 16) is calculated and displayed in tabular form (FIG. 19) based on FIGS. 17–18.

The illustration X vs. benchmark display (FIG. 20) permits the comparison of performance of a company illustration with the benchmark performance depicting benchmark cash value 95, as will be discussed in detail later.

In addition, to the screen displays described above, the DPIS 20 also comprises the following features.

A lapse feature variable comprises part of the DICS 44. The lapse rate is used by an insurance company for calculating in-force policy considerations.

An alternate data entry screen (not shown) is available that permits the user to enter any variables year to year. This data entry screen comprises a series of alternate assumptions that can be selected by a user to test various patterns of variables. For example, industry average interest earnings rates can be entered from 1900 to the present and used in the interest assumption instead of a single interest rate for all years. In particular, an historical interest rate (e.g., for a whole life insurance policy an actual historic average of a company's dividend crediting rates, or for a universal life insurance policy an industry average of universal life interest crediting rates) over a range of years can be used in the dynamic illustration. Improving or declining mortality assumptions can be entered. A changing death benefit or alternate premium schedule can be entered. Cash values can be updated to the current year and the DICS main screen 56 can illustrate future values. This is useful for in-force policy (to be discussed later) reviews. This data screen entry thus permits the insertion of indices for changing assumptions that include data that may cover a selectable period of time. Once the time period of a particular changing assumption is selected, the index can be run forward in time, or run backward in time or a random application of the index can be used in running the dynamic illustration.

In addition, the DPIS 20 includes the ability to show all values as present values.

Figure 26:
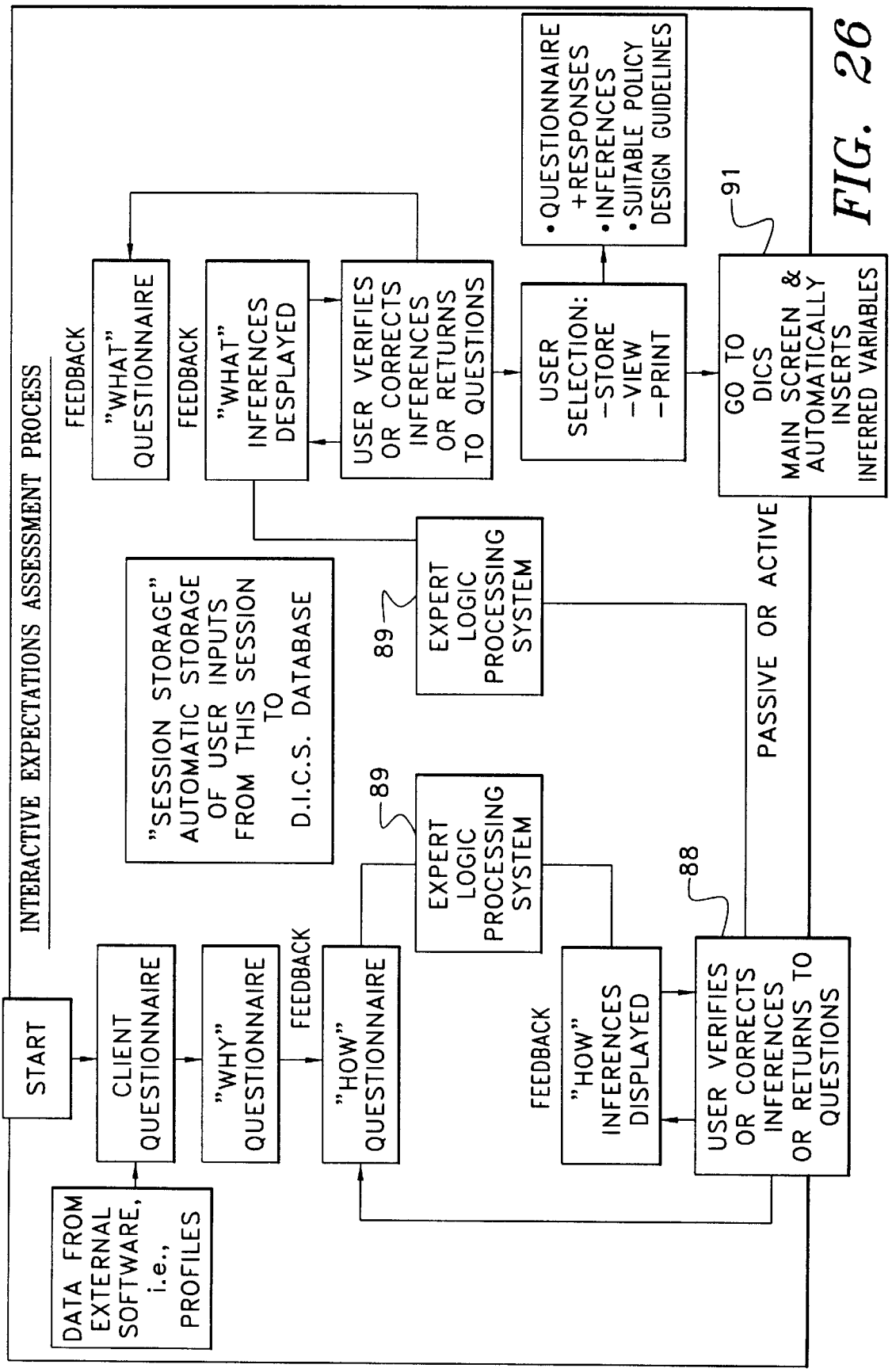
FIG. 26 is a flowchart for the interactive expectations assessment process.

As is shown most clearly in FIG. 26, the user is initially taken through an interactive expectations assessment process. Each question answered by the user leads to a different "next" question. Associated with the questions are numbers derived from the DICS 44. The user verifies or corrects the inferences presented (verification step 88) before continuing on in the questionnaire process. This ensures an accurate assessment of the user's inferences before the future values analysis using the main screen 56 is reached. In particular, the user is first asked a set of "why" and "how" questions. These non-insurance type of questions help the user and the agent establish a sense of risk that the user is willing to take. The responses of the user are then processed by the DICS 44, in particular an expert logic processing system 89 (hereinafter "ELPS") within the DICS 44, and then the results are displayed back to the user known as "how" inferences. The ELPS 89 is a set of logical rules which produce inferences about the user's insurance risk tolerance and preferences. These are displayed on the computer screen for the user to read. If the user disagrees with any inferences he/she can select a button which will return the user to the questions in the questionnaire that created these inferences and change his/her responses. Additional information about this user may be imported through the links 41 with other software systems into the ELPS 89 and used to create the resulting inferences. The user is then asked to verify or correct these "how" inferences, thus establishing an interactive feedback between the DICS 44 and the user. When completed, the user has established a proposed type of life insurance policy that the DICS 44 now operates on as the interactive process continues.

The next set of questions, the "what" questions, are insurance specific questions to which the user responds. Again, the DICS 44 processes these responses using the expert logic processing system and displays the "what" inferences back to the user. The user is then asked to verify or correct these "what" inferences, establishing another interactive feedback between the DICS 44 and the user. When completed, the DICS 44 is now ready to run the illustration on the DICS main screen 56. In particular, the ELPS 89 processes the verified or corrected inferences to modify the previously-inputted variables, thereby forming inferred variables, as shown in the block 91 in FIG. 26. Thus, once the interactive process is complete, these inferred variables are automatically inserted into the main screen 56 to set the variables on the main screen 56 to the most suitable setting for a particular user; in addition, these inferred variables are also stored as part of the particular user's session. These inferred variables are also used in generating the Agent Policy Design Guidelines (Appendix C), as will be discussed later.

In the alternative, a non-interactive questionnaire (Appendix E) would be completed by the user initially. This non-interactive questionnaire comprises a static list of approximately 6–10 questions and a paper scoring method.

The output of the interactive expectations assessment process (FIG. 26) are the following:
(1) a client "risk-tolerance" assessment;
(2) a suggested illustration design including:
 (a) type of insurance: term, universal, whole, variable, etc.;
 (b) premium level;
 (c) increasing or level option;
 (d) dividend option (participating policies only);
 (e) interest rate suggested for illustration;
 (f) mortality rate suggested (based on rating category);
(3) automatically loading the main screen 56 with the suggested illustration design; and
(4) a printout is available which summarizes the design recommendations.

A client risk/tolerance assessment display (not shown) records the user's responses to a series of choices given him in his/her use of the main screen 56. This establishes a risk profile which can be displayed in a separate full screen (not shown) or the risk profile can be compared to the Illustration Risk Assessment. Awareness of the user's risk profile in comparison to the illustration's inherent risk enables the user to select input premium assumptions which may better meet his/her expectations. In particular, this display comprises a bar chart having a vertical axis labeled from 1 to 5 in an upward direction. The left side of this display is the user's risk tolerance, with the number 5 indicating the most risk and number 1 indicating the least risk. The right side of this display is the inherent risk in the illustration. Thus, as the risk increases, the bar changes color with green indicating the least risk and red indicating the most risk. To develop this display, a client risk/tolerance assessment questionnaire (Appendix E) is completed initially.

Once the user arrives at the main screen 56, the analysis of the future values of the proposed life insurance policy is as discussed earlier.

Figure 27:
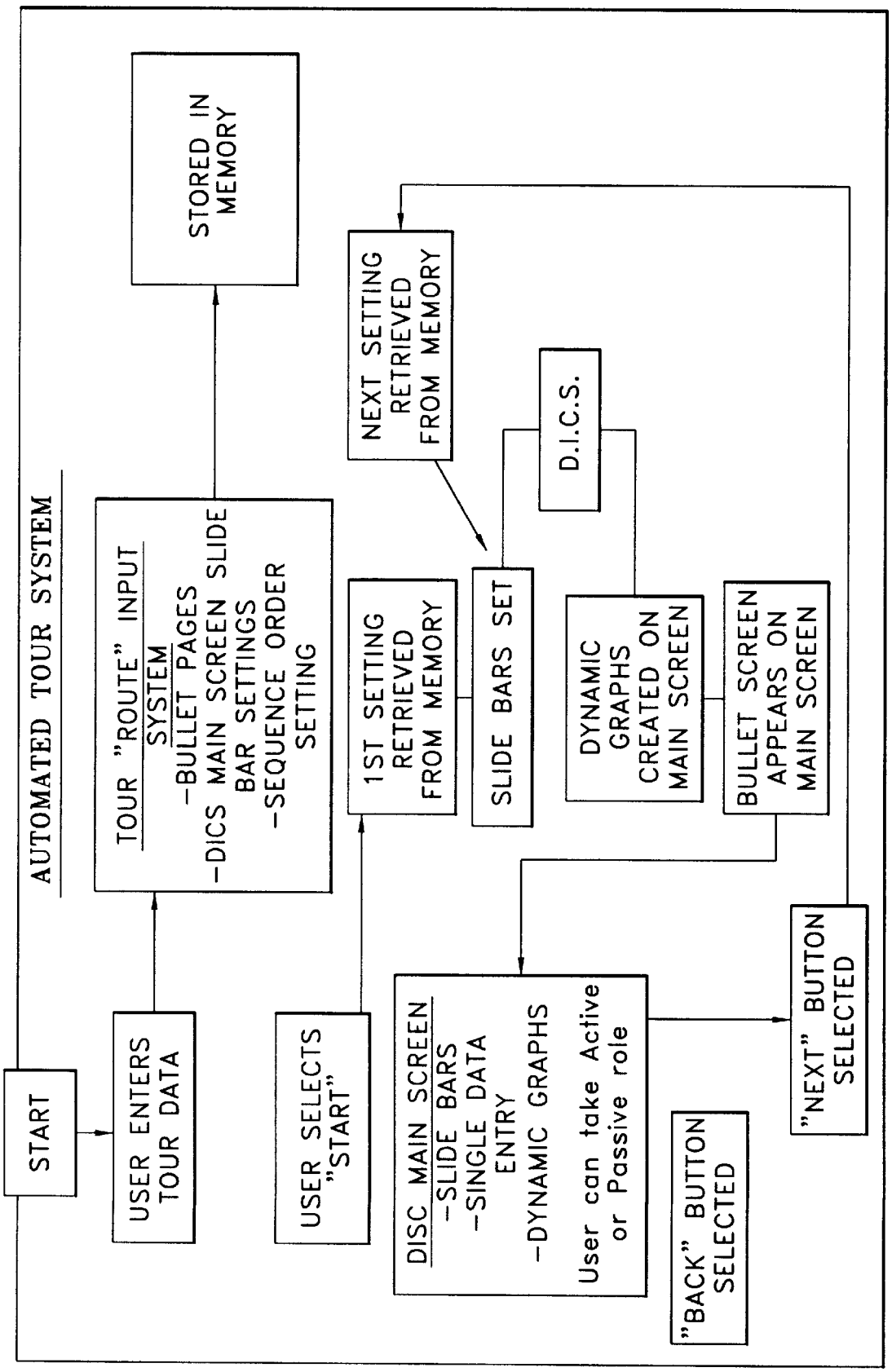
FIG. 27 is a flowchart for the automated tour system.

As shown in FIG. 27, there is an automated tour system that gives the user a tour of how the DPIS 20 operates. In particular, agents wishing to take their client through a pre-constructed set of examples can do so using the automated tour system. Individual screens of text can be created by the user. These screens are assigned a sequence order and calculator inputs. This order and inputs can be accessed by moving forward or backward in the order selected during the agent's presentation to the client. For example, the agent may wish to show the client: guaranteed values, current values, less than 1% interest values or less than 2% interest values. Using the automated tour system, each DICS illustration is preceded by (or accompanied with) a screen display showing bullets of the main concepts the agent wants to emphasize with each example. These screens and illustrations can be printed out in a report following the session.

Figure 28:
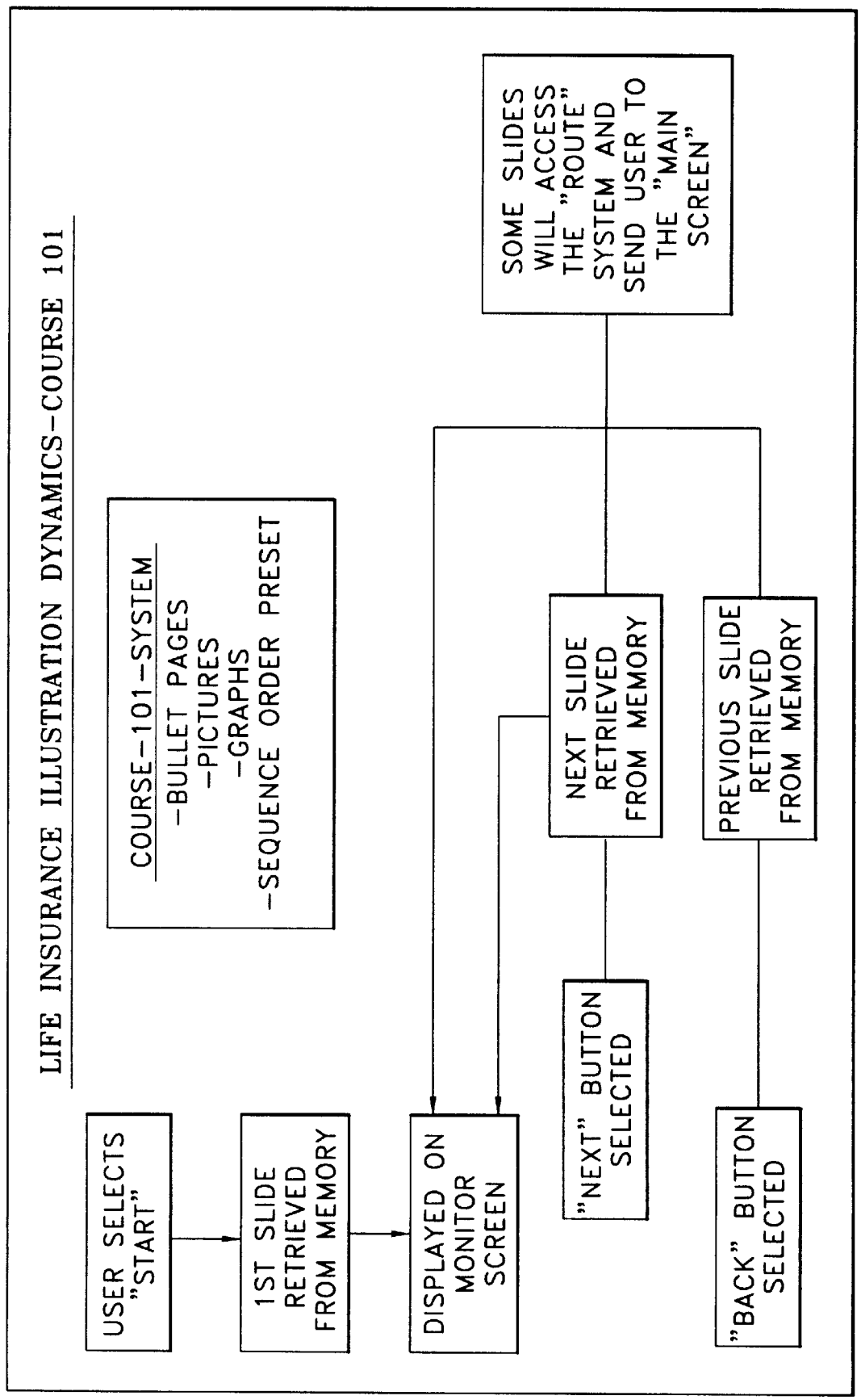
FIG. 28 is a flowchart for the life insurance illustration dynamics-course 101.

As shown in FIG. 28, the DPIS 20 includes a "Life Insurance Illustration Dynamics Course 101" that educates the user about the main interactive elements of life insurance. The automated tour system uses the DICS to illustrate policy performance under various combinations of variables.

Figure 30:
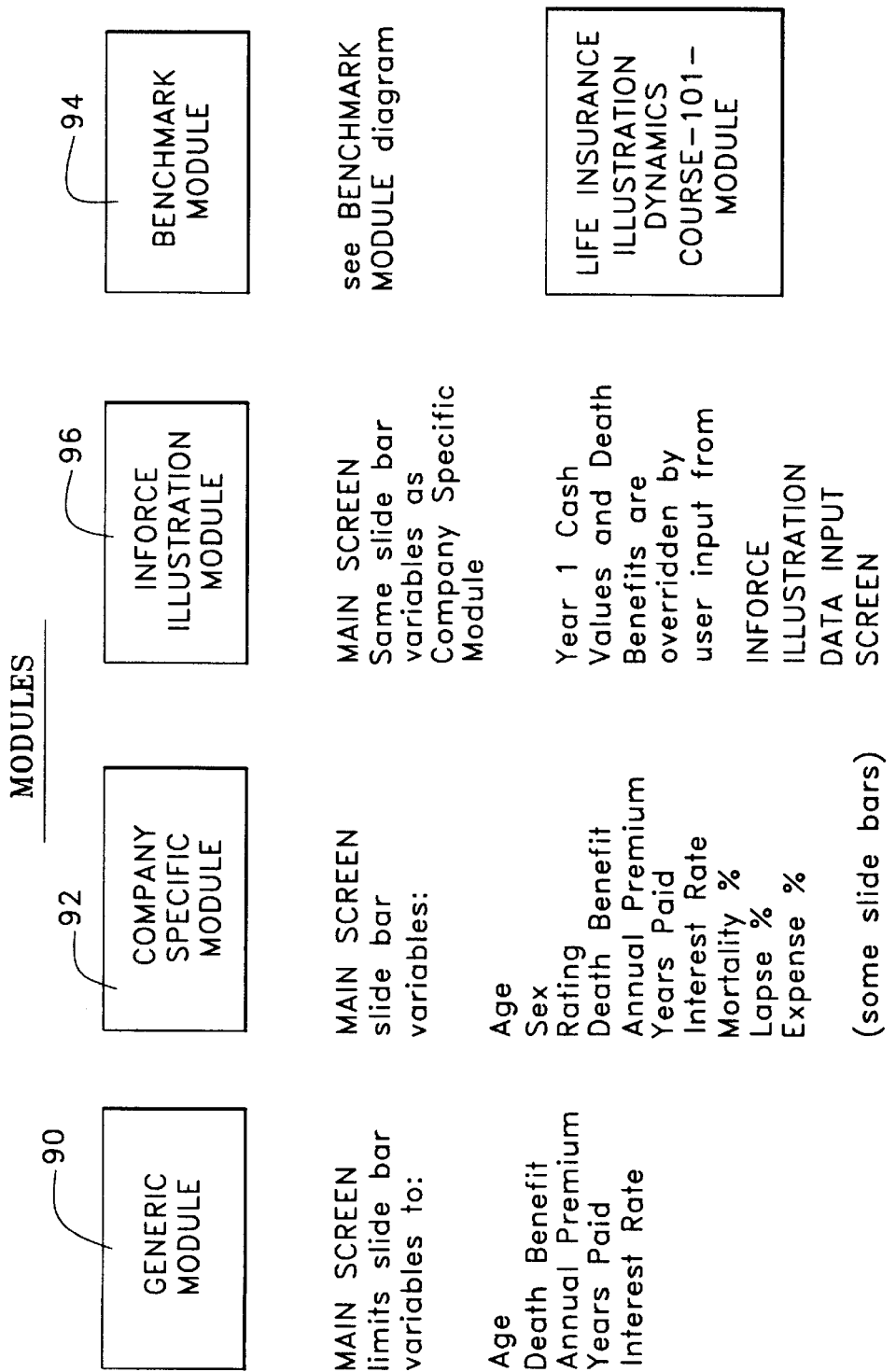
FIG. 30 is a block diagram of the different modules of the present invention.

As shown in FIG. 30, the DIPS 20 comprises four modules: a generic module 90, a company specific module 92, a benchmark module 94 and an in-force illustration module 96.

The generic module 90 is purely an educational module and is not an illustration under the NAIC (National Association of Insurance Commissioners) regulations. The module 90 enables the user to explore the sensitivity of life insurance to changes in death benefits, age, premium, premium paying years, interest rates and mortality assumptions. In particular, the mortality rates, as used by the generic module 90, are sex neutral (i.e., male), smoker rates of the specific insurance company with which the agent is contracted. In the alternative, a set of generic mortality rates (representing no specific company) can be used. In either case, the goal of the generic module is to enable the agent to teach illustration concepts which yield policy values somewhat equivalent to those values that the agent could actually determine with his/her insurance company's policy calculation system without producing an NAIC-compliant illustration. The generic module 90 limits the slide bars 72A–72E to age, death benefit, annual premium, years paid and interest rate. A printout (see Appendix C) is available from the generic module 90 for the agent for specifying the illustration design elements. In addition, the generic module 90 stores a record of the illustrations, which were presented generic session, in a session storage location.

The company specific module 92 illustrates a specific insurance company's product. This module 92 reviews the user's illustration choices, including the upside opportunities and the downside risks (FIGS. 16–19) in the actual policy that the user is considering. The module 92 prints out the completed Client Expectations Assessment (Appendix D) and Agent Policy Design Guidelines (Appendix C) for the agent to input into the agent's regular NAIC-compliant illustration system. This ensures that the NAIC-compliant illustration system runs an identical illustration that was seen on the main screen 56. In particular, the Agent Policy Design Guidelines (Appendix C) comprises a hard copy of agent criteria necessary to an agent for running an illustration, in accordance with NAIC, on that agent's company's particular computer policy calculation system. This report sets forth all the requisite data such that it can be manually entered to reproduce the illustration. In addition, the company specific module 92 can also provide a hard copy of the NAIC-compliant illustration. The company specific module 92 provides for the adjustment of the following variables using the slide bars 72A–72E: age, sex, rating, death benefit, annual premium, years paid, interest rate, mortality %, lapse % and expense %.

It is within the broadest scope of the DPIS 20 to include an electronic file as part of the memory 22 that stores all of the requisite data necessary (including the data set forth in the Agent Policy Design Guidelines) to reproduce the illustration. This electronic file is readable, through the link 41, by other application programs so that the requisite data can be imported into any conventional NAIC-compliant illustration program which may reside in the same computer 24, or the requisite data can be transmitted to a remote computer location (e.g., via the Internet) where the conventional NAIC-compliant illustration program may reside. This file can also link so as to import data from other software systems for use in the DPIS 20. Thus, the electronic file makes it possible for the particular insurance company to reproduce the illustration without the need to manually enter the data.

Figure 21:
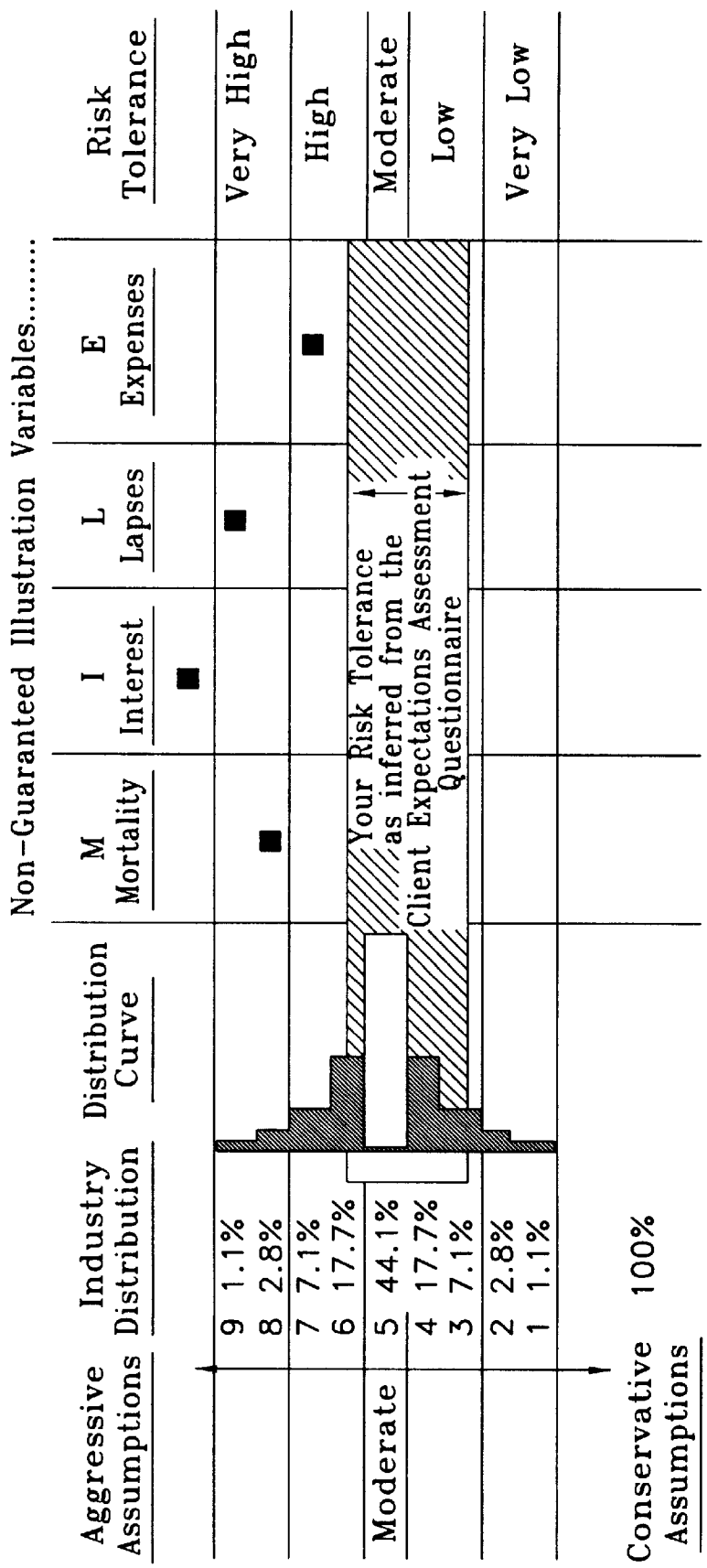
FIG. 21 shows a benchmark illustration/risk analysis report.
Figure 31:
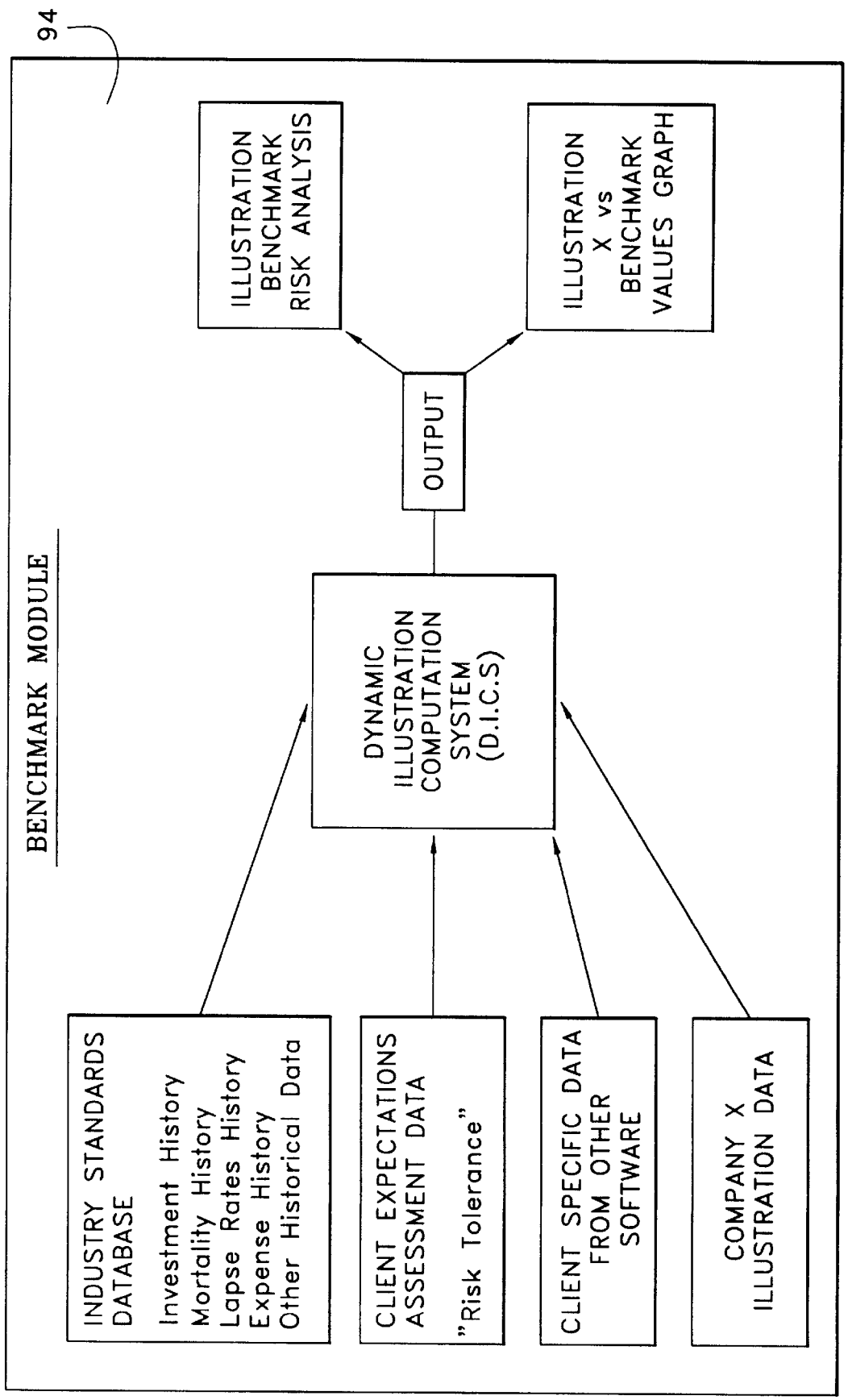
FIG. 31 is a block diagram for the benchmark module.
Figure 32:
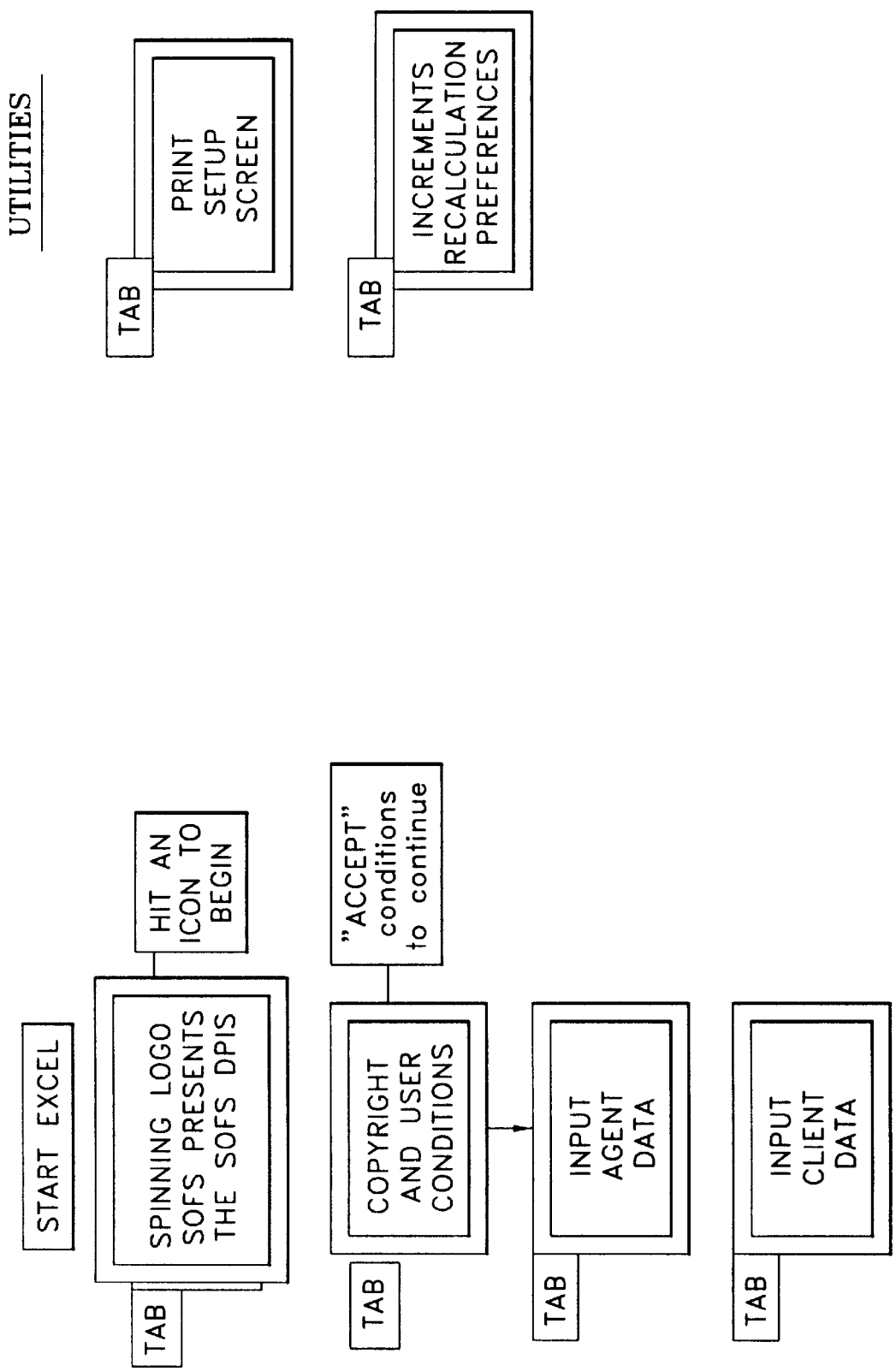
FIGS. 32–35 constitute an overview of the present invention operation.
Figure 33:
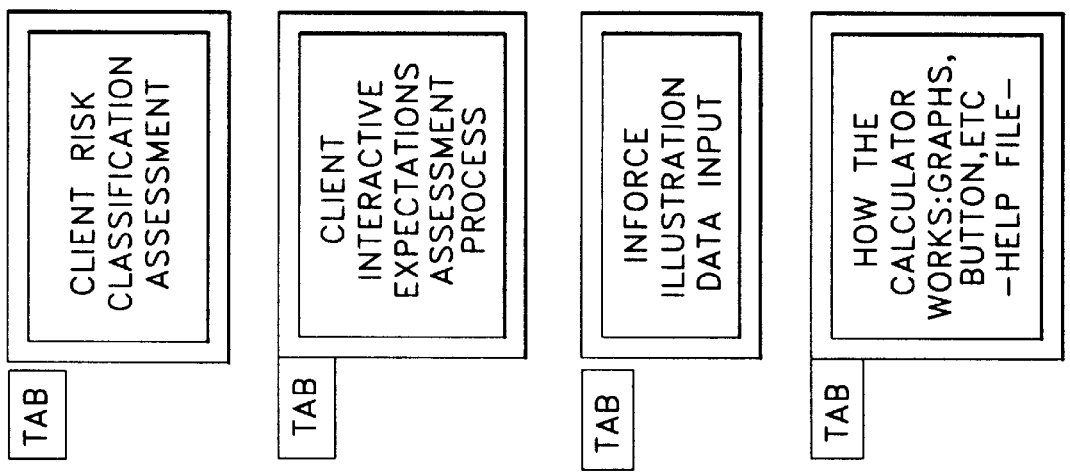
Figure 34:
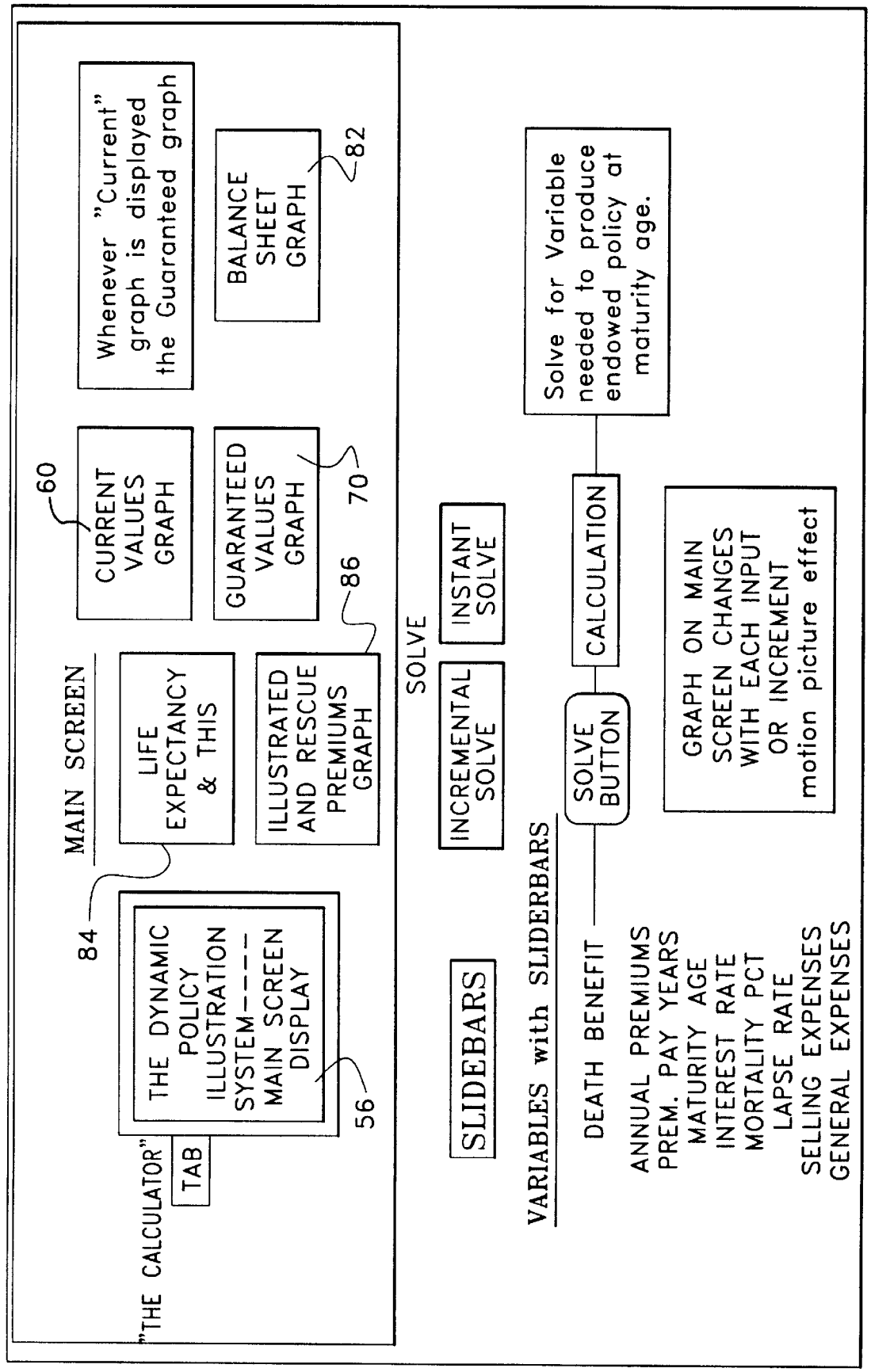
Figure 35:
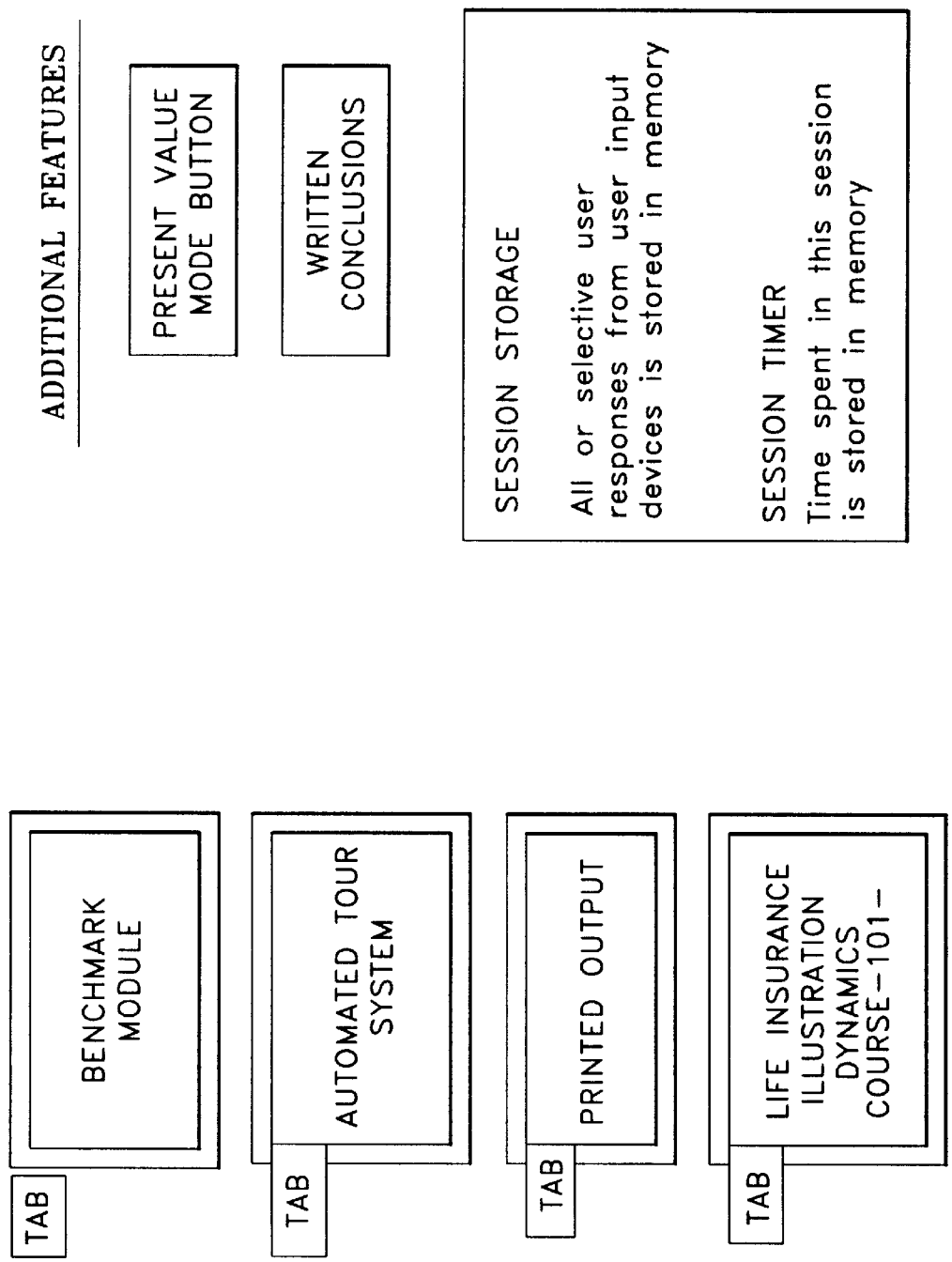

The benchmark module 94 (FIG. 31) allows for the entry of data from an outside company insurance illustration. The benchmark module uses illustration assumptions based on industry standards and compares the performance of the company illustration with the benchmark performance. In this module 94, individual non-guaranteed variables are solved in order to make the performance of the benchmark match the company illustration. The resulting variable values are compared to industry standards and reported visually to the user in the Illustration/Benchmark Risk Analysis (FIG. 21 and Appendix B).

For example, if the solved interest rate required were 10%, the main screen 56 (FIG. 20) plots the 10% on a chart which demonstrates that this policy would have to perform in the top tenth of 1% of life insurance companies to meet its illustrated performance. Thus, the user is permitted to judge whether or not he/she wishes to take the degree of risk associated with this policy.

The in-force module 96 is similar to the company specific module 94 and permits the user to modify the current year's cash values and death benefits in order to reflect the policy's current, in-force values, today. The in-force module 96 allows for the "what-if" illustrations of future values under various assumptions. The in-force module 96 is used in policy review sessions. The module 96 allows the client and agent to determine what redesign or reconstruction steps should be taken based on changing client attitudes and policy economics. The client assessment would normally be reconducted during the policy review process and printed out, in addition to the in-force illustration and graphs. The in-force module 96 permits the modification of the same variables as discussed above with respect to the company specific module 92. Year 1 cash values and death benefits are overridden by user inputs from the in-force illustration data input screen (FIG. 25).

The DPIS 20 also includes a help system that comprises "hot" keys (not shown) which lead directly from the screen display to a help file. This help file also contains a glossary of terms that is directly accessible from any word on the screen or through use of an index file.

The DPIS 20 includes a print screen (not shown) that sets forth the various types of reports that can be printed out on the printer 38. The four printed reports available in the DPIS 20:

(1) Client Expectations Assessment Questionnaire (Appendix D) with client responses, signature required;
(2) Risk Classification Assessment Questionnaire (Appendix A);
(3) Feedback Expectations Assessment (Appendix F);
(4) Agent Policy Design Guidelines-(Appendix C) which includes agent guidelines for running the DPIS 20;
(5) Session Log-a list of illustrations examined during the session and time spent on each; and
(6) Benchmark Report (Appendix B).

With regard to the Client Expectations Assessment Questionnaire report, the user is asked to confirm or restate the conclusions he/she has drawn from using the main screen 56. These conclusions serve as a written record of the user's awareness of the variability, risks and opportunities contained in the life insurance policy he/she may be considering to buy or already own. This report can be used to remind a client of his/her past responses and to compare the changes in his/her current opinions about these issues. This is helpful for annual reviews and as a defense for the insurance agent's recommendations in the event of a future complaint is filed by the client.

With respect to the List of Illustrations, this is a session log that memorializes what the user did, e.g., all the data entered by the user, the time spent on particular functions, etc., in a tabular form. Thus, all user responses are stored for further analysis and reports as part of the Session Log.

Both generic policy assumptions or customized specific company assumptions could be entered into this system.

Without further elaboration, the foregoing will so fully illustrate my invention that others may, by applying current or future knowledge, readily adopt the same for use under various conditions of service.

APPENDIX A

Risk Classification Assessment Questionnaire

These questions are designed to provide a way to more accurately reflect your actual "risk classification" and are not intended to replace any questions on a company's application.

1. When, if ever, was the last time you used tobacco products of any kind? Please specify what kinds you use, or used to use and how often were, or are you using, and when you stopped.

APPENDIX A

Risk Classification Assessment Questionnaire

These questions are designed to provide a way to more accurately reflect your actual "risk classification" and are not intended to replace any questions on a company's application.

1. When, if ever, was the last time you used tobacco products of any kind? Please specify what kinds you use, or used to use and how often were, or are you using, and when you stopped.

|  | Never Used | Currently Use | Used to Use | Last Date Used |
|---|---|---|---|---|
| Cigarettes | ☐ | ☐ | ☐ | __/__/__ |
| Cigars | ☐ | ☐ | ☐ | __/__/__ |
| Pipe | ☐ | ☐ | ☐ | __/__/__ |
| Snuff | ☐ | ☐ | ☐ | __/__/__ |
| Other___ | ☐ | ☐ | ☐ | __/__/__ |

2. Other than colds, flu, minor ailments, and/or injuries, what medical conditions do you have, and what illnesses, injuries, or surgical procedures have you had or been advised to have?

| Description | Approximate Dates |
|---|---|
| _____ | _____ |
| _____ | _____ |
| _____ | _____ |

3. Have any members of your immediate family died before age 60 of cancer, heart disease, stroke, or diabetes and if so, please give cause and age at death

APPENDIX A-continued

Risk Classification Assessment Questionnaire

| Family Member | Cause of Death Before Age 60 | | | |
|---|---|---|---|---|
| | Cancer | Heart Disease | Stroke | Diabetes |
| Mother | ☐ | ☐ | ☐ | ☐ |
| Father | ☐ | ☐ | ☐ | ☐ |
| Brother | ☐ | ☐ | ☐ | ☐ |
| Sister | ☐ | ☐ | ☐ | ☐ |

4. Do you engage in any hobbies or recreational sports which are considered hazardous?

☐ Yes ☐ No
☐ fly as a private pilot or crew member?
☐ had more than 3 moving violations in the last 2 years
☐ ever had a DUI (if yes, when?) __/__/__
☐ Declined, ☐ Rated, ☐ Postponed
☐ Offered a policy other than applied for:
Details of any "yes" answers above: _____
_____
_____

5. Height
___ft.___in.   Weight____lbs.   Weight gain/loss in past year?___

Any current prescription medications taken?

| Name of Medication | Dosage/Day |
|---|---|
| _____ | _____ |
| _____ | _____ |

APPENDIX B

This chart (FIG. 21) is designed to help you visualize the degree of risk that may be inherent in the illustration you are studying. The blue dots are placed on a scale that compares the rate of performance that would have to be achieved by this carrier to deliver the results illustrated. The further up the scale the blue dots lie, the fewer there are of companies that have actually achieved this result. You are, therefore, taking a higher risk with these assumptions.

Lower risk illustrations are indicated by dots lower in the columns.

Question: Are you comfortable with the illustration risk indicated by this chart (FIG. 21)?

Industry Distribution: The reported industry experience for each of four illustration variables (mortality, interest, lapse rates and expenses) is spread out to indicate the percentage of companies reporting results in each of 9 percentile groups.

Your Risk Tolerance: The results of your preference questionnaire are translated into our opinion of a range of illustration variables which are suitable to you.

Figure 24:
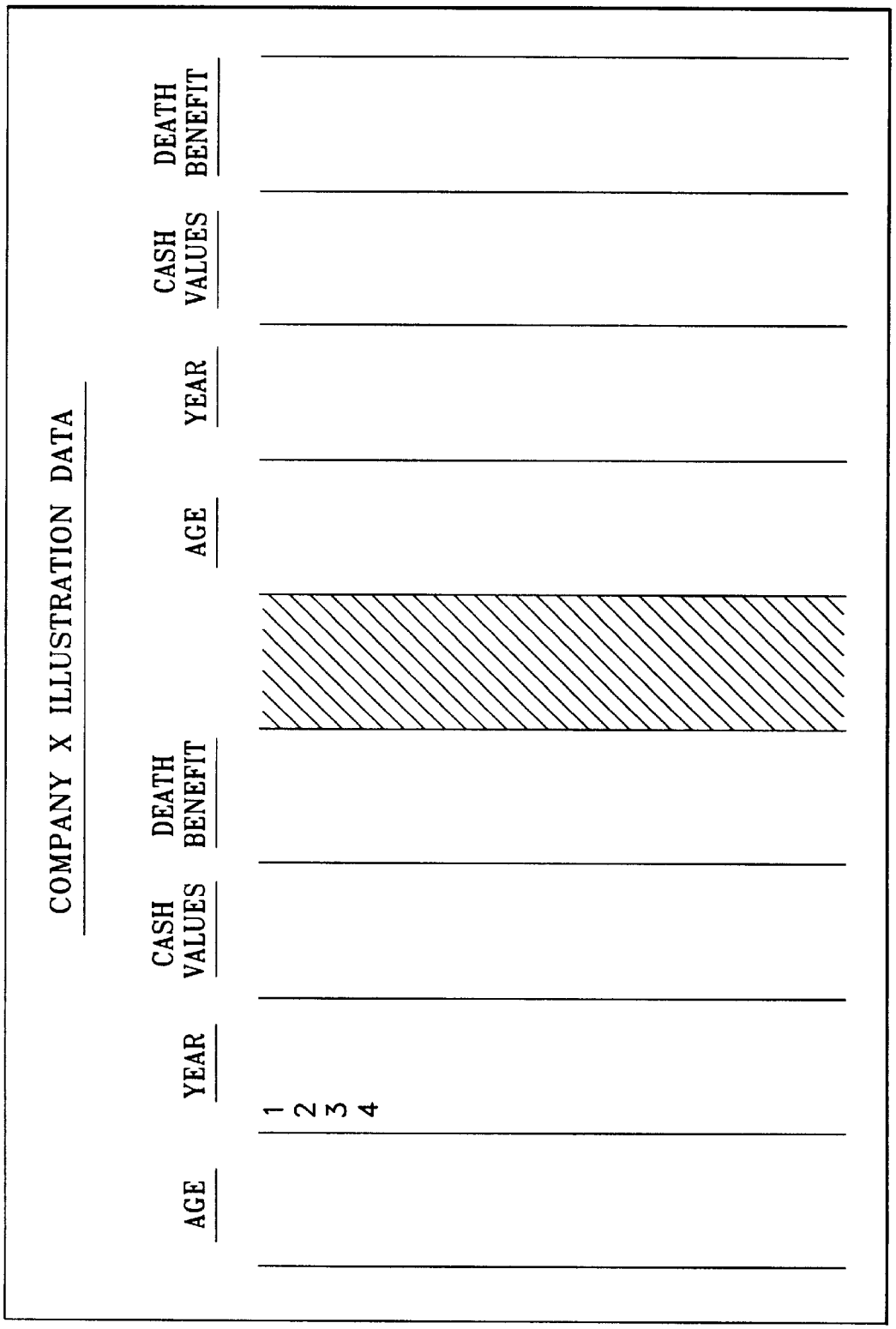
FIG. 24 is the company X illustration data used as input for the benchmark report.

The Illustration's Variable Risk: The face value and premiums are entered from your sample illustration (FIG. 24). The benchmark assumptions are then applied and solved for each of the four variables, one at a time, to see what performance would be needed so that the benchmark cash values and death benefits equal those of the sample illustration (Illustration X, FIG. 24).

APPENDIX B

The required performance is charted against actual industry results to indicate how likely or unlikely they might be to achieve.

APPENDIX C

Prepared For: John Q. Client

Agent Policy Design Guidelines

The following illustration guidelines will fall into an acceptable risk level based on this client's responses to the previous questionnaires and feedback.

| | |
|---|---|
| Face Value: | $1,000,000 Minimum |
| Type of Policy: | Survivor Life |
| | Whole Life or |
| | Universal Life |
| Term Blend (if whole life): | 0–50% |
| Target Cash Value (if UL or VL) | $1,000,000 at age 100 |
| Illustration Interest Rates | Illustration 1 |
| | |
| | Current (for WL or UL) |
| | 8% net for VL |
| | Illustration 2(use same premium schedule) |
| | |
| | Current less 1% |
| | 7% net for VL |
| | Illustration 3 |
| | |
| | Guaranteed |
| Premium Paying Years: | 20–life |
| Cash Out During Life: | None |
| | Since this death benefit needs to last to age 100 |
| Other Illustration Design Considerations: | |

APPENDIX D

CLIENT EXPECTATIONS ASSESSMENT

Life is often a "teeter-totter" of choice. We seek rewards, but there are risks. If we choose to take fewer risks, there are fewer rewards. The amount of risk taking we might choose is neither bad nor good; right nor wrong. The only thing wrong with taking risk is not knowing when you're taking it- or - when you're taking more than you expected.

The following questions are designed to help us understand your level of comfort with things with which you are familiar so that we can attempt to infer your likely comfort with aspects of life insurance with which you are perhaps less familiar.

Please indicate your "preference" to each set of choices:

1) You are replacing your washer and dryer. A new set costs between $500 and $1500 and appliance rating suggest that there is a relationship between price and how long the equipment will last without trouble.
   - Your tendency is to buy:
     ☐ For least price?    or    ☐ For longer life?
   - The standard warranty is 1 year. The cost of the 5-year extended warranty is 15% of the purchase price. Do you:
     ☐ Forget the warranty,    or    ☐ Buy the warranty?

2) We all experience inflation, although sometimes it is hard to define. Remember how you could buy a house 20 years ago for what you pay today for a new car? That's inflation. How concerned are you about including the likely cost of goods and services that we'll be paying for 20 years from now?

☐ Willing to sacrifice today's lifestyle for something I might not be around to worry about.    or    ☐ Not willing to sacrifice today's lifestyle for something I might not be around to worry about.

3) To the extent that you have money you can set aside for the future for "big ticket" items (college education, retirement, etc.) are you more inclined to:

a☐ Pick and manage individual investments such as stocks, bonds and CDs.    b☐ Use mutual funds or fund managers to make the investment.

c☐ Begin setting aside money    d☐ Pay as you go for those

APPENDIX D-continued

CLIENT EXPECTATIONS ASSESSMENT on a regular basis toward a future objective.    "big ticket" items with available funds.

e☐ Use CDs and bonds for investment objectives that are 10 years or more in the future.    f☐ Use stocks and real estate for investment objectives that are 10 years or more more in the future.

4) You are considering buying your dream house and are looking at various mortgage options. A fixed mortgage at 8% would result in a payment that is somewhat above your means, but your monthly payments could never go up. The other option is for a variable mortgage currently at 6%-for which the monthly payment is affordable now but could go up 50% in the future. Do you:

a☐ Take the higher payment that can't go up.    b☐ Take the lower payment that could increase substantially.

c☐ Buy "down" somewhat so the fixed payments are more affordable.    d☐ Buy the dream house and expect that future income will cover any increase in payments.

As a variation on the above example, assume that you do not have a budget problem with either mortgage payment, however, you have the option of using a mortgage with a 15-year amortization or a 30-year amortization. The payments will be 20% higher than those of the 30-year plan, but the total amount of interest paid in 15 years vs. 30 years will be tens of thousands of dollars less. Do you:

a☐ Take the 15 year mortgage    or    b☐ Take the 30-year mortgage

APPENDIX E

CLIENT RISK ATTITUDES ASSESSMENT

1. You have plenty of money and it is time to buy a new car. Do you buy:
   a. A Ford Neon or
   b. A Cadillac
2. To the extent that you have money you can set aside for the future (college education, retirement, etc.) are you more inclined to:
   a. pick and manage your stocks, bonds and savings accounts, or
   b. to hand the management responsibilities over to a professional investment manager?
3. You are about to make a big ticket purchase requiring a fair amount of professional knowledge. You have been referred to a person with the skills you need by someone you trust and you just found out that your brother in law just entered a training program (a) the referred professional? (b) your brother-in-law?
4. What do you think you would prefer to invest college funds in for college starting in about 10 years?
   CD's _____    A mutual fund of 1    2    3    4    5    common stocks 5. You are considering buying your dream house and are looking at various mortgage options. Rank your inclination from 1–5:

Take a 30 year fixed mortgage at 9% with a monthly payment that is higher than your comfort level    a variable mortgage with a comfortable payment at the current rate of 7% that can go as high as 13% in the future 1    2    3    4    5

6. In considering your preferences to you in the purchase of a new car. Choose the one that is most important to you:
   1. Style
   2. 0–60 in under 6 seconds
   3. fuel economy
   4. the Consumer Reports maintenance rating

APPENDIX E-continued

CLIENT RISK ATTITUDES ASSESSMENT 5. resale value
7. You are replacing your washer and dryer set. They cost between $700 and $1,300 and appliance ratings suggest that there is a relationship between price and reliability.
   a. Your tendency is to buy:

the less _____ the more
   expensive                        expensive 1    2    3    4    5 b. The standard warranty is 3 years. The cost for the extended maintenance is 15% of the purchase price. How inclined are you to buy the extended warranty which can only be elected at the time of purchase?

very inclined _____ not inclined at all 1    2    3    4    5

APPENDIX F

Assessment

For: James G. Powers
Prepared by: John Q. Agent, CLU
January 1, 1996

| TYPE OF POLICY | COMMENTS |
|---|---|
| $1,000,000 Permanent | Initial Death Benefit<br>You should consider a permanent type of life insurance, given the long-term need you have indicated. |
| Variable | Your responses suggest that you are risk tolerant and accustomed to managing your financial affairs. You might want to consider a Variable Life Insurance Polcy for potential reward consistent with your risk tolerance. HOWEVER: you should still follow the premium recommendation for the first few years to make certain that your policy "makes it" during the short-term possiblility of a down. When making projections of investment returns, we highly recommend that you first determine your asset allocation and then apply that allocation to the funds available in the policy you. Actual fund experience should be traced back at least five years (preferably 10 years) and only the actual return in that hypothetical selection should be applied to the investment return assumption of any illustration you review. |

| PREMIUM AMOUNT | |
|---|---|
| Higher Prem/w or w/o Mgmt | Your responses reflect a low priority on lowest intial price if it will result in the possibility of incurring higher costs of maintaining the policy into the future. We recommend paying a premium that is based on greatly reduced assumptions about the future. In this way, you will be creating a significant "buffer" against lower interest rates or other negative policy economics adversely affecting your policy. You will want to make certain to review the policy through 5-year reviews with your agent. Even with the hypothetical assumptions set low, there always remains the possibility you may have to adjust upward somewhat your premium level in the future. Of course, in the event that actual policy |

APPENDIX F-continued

Assessment

For: James G. Powers
Prepared by: John Q. Agent, CLU
January 1, 1996 performance exceeds the initial assumptions we make here, you may later choose to manage your premium payments to take advantage of these.

| DURATION OF PAYMENT | |
|---|---|
| paid for 137 years | Your responses suggest that . . . |

| LEVEL/INCREASING DEATH BENEFITS | |
|---|---|
| Increasing DB | Your responses indicate concern about the higher future costs typically associated with inflation. If this is an accurate reflection of concerns, you will probably be comfortable with a death benefit that increases throughout the time you maintain the policy. and you may want to test the premium sensitivity to this approach. |

_____     _____
client signature              date

I claim:

1. An apparatus for dynamically displaying future values of a life insurance policy's data in graphical format, said apparatus comprising:

a computer including a memory and a processor, a monitor display coupled to the computer for dynamically displaying the insurance policy's data in the graphical format, an input means coupled to the computer for inputting variables related to said insurance policy's data into the computer by a user, said memory including:

an insurance calculation means, operable by said processor, for using the variables in a plurality of calculations to create said future values;

a graphical user interface, operable by said insurance calculation means, for providing said insurance policy's data in line graphs, area graphs, and bar graphs to the monitor, a charting means for combining said line graphs, area graphs and bar graphs into a single screen display on the monitor, said insurance calculation means controlling the graphical user interface according to a range of values of the at least one variable to generate a continuously changing display of said line graphs, area graphs and bar graphs in said single screen display for demonstrating the effects of modifying the at least one variable, and means for modifying the at least one variable by any user to change said display of said line graphs, area graphs and bar graphs to reveal the risk inherent in the life insurance policy.

2. The apparatus of claim 1 wherein said line graphs, areas graphs and bar graphs are dynamically displayed in respective colors.

3. The apparatus of claim 1 wherein the variables comprise a client's age, gender and rating class, face value of a life insurance policy, annual premiums, number of years premiums are paid, interest rate, mortality table percentage.

4. The apparatus of claim 3 wherein the variables further comprise sales expenses and general expenses.

5. The apparatus of claim 3 wherein said graphical user interface dynamically displays a second single monitor screen display the cumulative values, in any observation year, of policy factors including premiums, interest, mortality expenses, general expenses and cash values using respective adjustable regions for each policy factor to form a balance sheet of the cumulative values of the policy factors in a geometrical representation.

6. The apparatus of claim 5 wherein said insurance calculation means controls said graphical user interface through a range of values of said at least one variable to a substantially continuously changing display of said balance sheet of the cumulative values of the policy factors in said geometrical representation for demonstrating the relative importance each of the policy factors has in the performance of the policy.

7. The apparatus of claim 5 said graphical user interface dynamically displays a third single monitor screen, said third single monitor screen display forming a graphical depiction of the actuarial chance of a user being alive at every age between a user's current age and an older predetermined age and including indicia representing an age where 50% of those people in the user's risk group have died.

8. The apparatus of claim 7 wherein said third single monitor display includes a dynamic representation of an in-force policy illustration through a range of values that reflects the future values of a currently-implemented insurance policy.

9. The apparatus of claim 8 wherein said insurance calculation means controls said graphical user interface through a range of values of said at least one variable to a substantially continuously changing display of said in-force policy illustration.

10. The apparatus of claim 7 wherein said graphical user interface dynamically displays a fourth single monitor screen, said fourth single monitor screen display forming a graphical depiction of the illustration risk comprising a level of premiums that may be required to continue a policy in force to a predetermined age if the insured lives beyond a predetermined life expectancy age.

11. The apparatus of claim 10 wherein said insurance calculation means determines said level of premiums by permitting the policy to nearly lapse at said predetermined life expectancy and then calculating premiums necessary to keep the policy in force from said predetermined life expectancy age to said predetermined age.

12. The apparatus of claim 11 wherein said graphical user interface depicts a bar graph of a risk ratio, said risk ratio being defined as a ratio of high premiums, based on guaranteed values necessary to produce a desired death benefit, to low premiums, based on current interest and mortality rates necessary to produce the desired death benefit.

13. The apparatus of claim 11 wherein said graphical user interface depicts a bar graph of an opportunity ratio, said opportunity ratio being defined as a ratio of high insurance death benefits, based on all scheduled premiums being paid at current interest and mortality rates, to low insurance death benefits, based on the scheduled premiums but using guaranteed interest and expenses for calculating the death benefit.

14. The apparatus of claim 10 wherein said graphical user interface dynamically displays a fifth single monitor screen display, said fifth single monitor screen display forming a graphical depiction of an illustration of a particular insurance company policy versus a benchmark illustration, said benchmark illustration comprising illustration assumptions based on industry standards and benchmark performance.

15. The apparatus of claim 14 wherein said fifth single monitor display comprises:
 area graphs corresponding to the death benefit and the cash value of the illustration of the particular insurance company policy,
 bar graphs corresponding to said benchmark illustration, and
 line graphs corresponding to cumulative premiums.

16. The apparatus of claim 15 further comprising a printer coupled to said computer, said printer outputting a plurality of documents.

17. The apparatus of claim 15 wherein one of said plurality of documents is a hardcopy of said single screen display.

18. The apparatus of claim 15 wherein one of said plurality of documents is a hardcopy of said second single monitor screen display.

19. The apparatus of claim 15 wherein one of said plurality of documents is a hardcopy of said third single monitor screen display.

20. The apparatus of claim 15 wherein one of said plurality of documents is a hardcopy of said fourth single monitor screen display.

21. The apparatus of claim 15 wherein one of said plurality of documents is a hardcopy of said fifth single monitor screen display.

22. The apparatus of claim 15 wherein one of said plurality of documents is a benchmark report.

23. The apparatus of claim 14 further comprising a printer for outputting a hardcopy of agent criteria necessary to an agent for running an illustration in accordance with NAIC.

24. The apparatus of claim 23 further comprising an electronic file in said memory, said electronic file being readable by an external application program and said electronic file storing all requisite data of said single monitor screen display, said second monitor screen display, said third monitor screen display, said fourth monitor screen display and said fifth monitor screen for use in the external application program.

25. The apparatus of claim 5 wherein said insurance calculation means includes means for displaying all values as present values.

26. The apparatus of claim 5 wherein said insurance calculation means permits the modification of any variables from year to year.

27. The apparatus of claim 1 wherein said insurance calculation means generates guaranteed future values in a second set of line graphs, area graphs and bar graphs and wherein said apparatus further displays a graphic illustration of said second set of line graphs, area graphs and bar graphs simultaneously in said single monitor screen display.

28. The apparatus of claim 27 wherein said line graphs of said second set of line graphs, area graphs and bar graphs comprise guaranteed cumulative premiums.

29. The apparatus of claim 28 wherein said area graphs of said second set of line graphs, area graphs and bar graphs comprise guaranteed cash value and death benefits.

30. The apparatus of claim 29 wherein said bar graphs of said second set of line graphs, area graphs and bar graphs comprise guaranteed yearly premiums.

31. The apparatus of claim 1 wherein said line graphs comprise cumulative premiums.

32. The apparatus of claim 1 wherein said area graphs comprise cash value and death benefits.

33. The apparatus of claim 1 wherein said bar graphs comprise yearly premiums.

34. The apparatus of claim 1 or 5 or 7 or 10 or 14 wherein said insurance calculation means comprises interactive means for obtaining user provided data and for generating inferences based on said user provided data, said inferences being displayed via said graphical user interface to the user for user verification or correction.

35. The apparatus of claim 34 wherein said insurance calculation means uses said verified or corrected inferences to modify the variables to form inferred variables for updating said monitor screen display.

36. The apparatus of claim 35 wherein said insurance calculation means further comprises means for generating agent criteria necessary to an agent for running an illustration in accordance with NAIC, said agent criteria comprising said inferences that are verified or corrected by the user.

37. The apparatus of claim 34 further comprising a printer for outputting a hardcopy of said inferences based on said user provided data.

38. The apparatus of claim 37 further comprising a session log means, said session log means storing all data entered by a user into said computer, the time spent using said insurance calculation means and the sequence of functions used in said insurance calculation means.

39. The apparatus of claim 1 wherein said input means comprises a keyboard.

40. The apparatus of claim 1 wherein said input means comprises a mouse.

41. The apparatus of claim 1 wherein said input means comprises a touch screen.

42. A method for illustrating risk of a life insurance policy, said method comprising the steps of:
   (a) providing a computer including a memory, a processor, input means and monitor;
   (b) supplying said computer with user-particular data;
   (c) supplying said computer with life insurance industry data tables;
   (d) calculating future values of a life insurance policy using said userparticular data and the insurance industry data tables;
   (e) modifying at least one variable of an insurance policy;
   (f) presenting a continuously changing graphical display on said monitor, said changing graphical display graphically demonstrating the effects on the life insurance policy as said at least one variable is modified; and
   (g) revealing the risk inherent in the life insurance policy as said at least one variable is modified.

43. The method of claim 42 wherein said step of presenting a continuously changing graphical display includes displaying cash value, death benefits and cumulative premium in respective colors.

44. The method of claim 43 further comprising the step of displaying all values as present values.

45. The method of claim 43 further comprising the steps of:
   (a) presenting a graphical depiction of the actuarial chance of a user being alive at every age between a user's current age and an older predetermined age and including indicia representing an age where 50% of those people in the user's risk group have died;
   (b) presenting a continuously changing representation of an in-force policy illustration, that reflects the future values of the currently-implemented life insurance policy, over said range of at least one variable of the insurance policy.

46. The method of claim 43 further comprising the steps of:
   (a) permitting the insurance policy to lapse or nearly lapse defining a first point in time;
   (b) determining a level of premiums necessary to keep the insurance policy in force from said first point in time to a later predetermined period of time; and
   (c) displaying in a graphical manner, on said monitor, said level of premiums and the amount of premiums paid before the insurance policy lapsed or nearly lapsed.

47. The method of claim 46 further comprising the steps of:
   (a) calculating premiums based on guaranteed values needed to produce a selected death benefit, thereby defining high premiums;
   (b) calculating premiums based on current interest and mortality rates to produce the selected death benefit, thereby defining low premiums;
   (c) calculating insurance death benefits based on premiums being paid at current interest and mortality rates, thereby defining high insurance death benefits;
   (d) calculating insurance death benefits based on guaranteed interest and expenses, thereby defining low insurance death benefits;
   (e) determining a risk ratio defined by the ratio of said high premiums to said low premiums;
   (f) determining an opportunity ratio defined by the ratio of said high insurance death benefits to said low insurance death benefits; and
   (g) presenting a graphical depiction of said high premiums, said low premiums, said risk ratio and said opportunity ratio.

48. The method of claim 42 further comprising the step of generating a graphical depiction of the guaranteed values of the life insurance policy.

49. The method of claim 48 further comprising the step of simultaneously displaying on the monitor said graphical depiction of the guaranteed values of the life insurance policy during said step of presenting a continuously changing graphical display.

50. The method of claim 42 wherein said step of supplying said computer with user-particular data further comprises the steps of:
   (a) asking the user a set of predetermined questions on the monitor;
   (b) developing inferences from the responses of the user to the set of predetermined questions;
   (c) displaying said inferences on the monitor to the user and requesting the user to verify or correct the inferences;
   (d) asking the user another set of predetermined questions on the monitor;
   (e) developing more inferences from the responses of the user to said another set of predetermined questions;
   (f) displaying said more inferences on the monitor to the user and requesting the user to verify or correct said more inferences; and
   (g) generating said user-particular data from said more inferences.

51. The method of claim 50 further comprising the step of using said user-particular data to modify the at least one variable to form at least one inferred variable for modifying said continuously changing graphical display.

52. The method of claim 51 further comprising the step of generating agent criteria necessary to an agent for running an illustration in accordance with NAIC, said agent criteria comprising said at least one inferred variable.

53. The method of claim 42 further comprising the step of storing all of said user-particular data, said future values and said range of said at least one variable in a readable electronic file.

54. The method of claim 42 further comprising the step of storing all of said user-particular data, the time spent using said computer and the sequence of steps used by said computer when operated by the user in a session log file.

55. A method for comparing a specific life insurance policy to benchmark performance, said method comprising the steps of:

(a) providing a computer including a memory, a processor, input means and monitor;

(b) supplying said computer with benchmark performance data;

(c) supplying said computer with life insurance industry standard tables, (d) supplying said computer with the specific life insurance policy data;

(e) calculating future values of the specific life insurance policy using said insurance industry standard tables and the specific life insurance policy data;

(f) presenting a graphical display, on said monitor, of the future values of the specific life insurance policy along with the benchmark cash value for comparing the effects on the specific life insurance policy with benchmark performance; and (g) revealing the risk inherent in the specific life insurance policy as compared with said benchmark performance.

* * * * *